United States Patent
Hüllen et al.

(10) Patent No.: US 10,632,538 B2
(45) Date of Patent: Apr. 28, 2020

(54) METHOD AND PRESS FOR PRODUCING A GREEN COMPACT COMPOSITE WITH A PREDETERMINED BREAKING POINT

(71) Applicant: GKN Sinter Metals Engineering GmbH, Radevormwald (DE)

(72) Inventors: Alexander Hüllen, Wachtberg (DE); Rainer Schmitt, Wachtberg (DE); Eberhard Ernst, Eichenzell (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 439 days.

(21) Appl. No.: 15/317,660

(22) PCT Filed: Jun. 10, 2015

(86) PCT No.: PCT/EP2015/062991
§ 371 (c)(1),
(2) Date: Dec. 9, 2016

(87) PCT Pub. No.: WO2015/189300
PCT Pub. Date: Dec. 17, 2015

(65) Prior Publication Data
US 2017/0113276 A1 Apr. 27, 2017

(30) Foreign Application Priority Data
Jun. 10, 2014 (DE) .................. 10 2014 008 169

(51) Int. Cl.
*B22F 7/06* (2006.01)
*B22F 3/03* (2006.01)
(Continued)

(52) U.S. Cl.
CPC ............. *B22F 7/06* (2013.01); *B22F 3/03* (2013.01); *B22F 3/04* (2013.01); *B22F 3/11* (2013.01);
(Continued)

(58) Field of Classification Search
CPC ..................................... B22F 7/06; B22F 3/03
(Continued)

(56) References Cited

U.S. PATENT DOCUMENTS

| 5,043,123 A | 8/1991 | Gormanns et al. |
| 2012/0216654 A1* | 8/2012 | Schmitt ............. B22F 3/03 75/228 |

FOREIGN PATENT DOCUMENTS

| DE | 10 2009 016718 A1 | 10/2010 |
| DE | 10 2009 042598 A1 | 3/2011 |

(Continued)

OTHER PUBLICATIONS

PCT International Search Report for corresponding International Application No. PCT/EP2015/062991; dated Oct. 1, 2015.

*Primary Examiner* — Weiping Zhu
(74) *Attorney, Agent, or Firm* — Quarles & Brady LLP

(57) ABSTRACT

The invention relates to a method for producing a green compact composite comprising at least a first partial green compact and a second partial green compact, wherein, within one pressing cycle, a powder is introduced into a filling chamber and then separated into a first partial quantity and into a second partial quantity, and, within the same pressing cycle, the respective partial quantities are pressed to form a first partial green compact and a second partial green compact and the partial green compacts are amalgamated after the pressing, wherein the amalgamation forms a press fit between the first partial green compact and the second partial green compact and produces a predetermined breaking point in the green compact composite. Furthermore, the invention proposes a green compact composite, a sintered component and also a press, each of which can be based on the proposed method.

9 Claims, 24 Drawing Sheets

(51) Int. Cl.
  *B22F 5/00* (2006.01)
  *B30B 11/00* (2006.01)
  *B30B 11/02* (2006.01)
  *B22F 3/11* (2006.01)
  *B22F 5/10* (2006.01)
  *F16D 9/06* (2006.01)
  *F16D 9/08* (2006.01)
  *F16D 1/08* (2006.01)
  *B22F 3/04* (2006.01)
  *B22F 3/16* (2006.01)
  *F16D 1/10* (2006.01)

(52) U.S. Cl.
  CPC ............... *B22F 3/16* (2013.01); *B22F 5/003* (2013.01); *B22F 5/10* (2013.01); *B22F 7/062* (2013.01); *B30B 11/005* (2013.01); *B30B 11/027* (2013.01); *F16D 1/0858* (2013.01); *F16D 9/06* (2013.01); *F16D 9/08* (2013.01); *B22F 2003/033* (2013.01); *B22F 2207/17* (2013.01); *B22F 2998/10* (2013.01); *F16D 1/10* (2013.01); *F16D 2001/102* (2013.01)

(58) Field of Classification Search
  USPC .......................................................... 419/38
  See application file for complete search history.

(56) References Cited

FOREIGN PATENT DOCUMENTS

| | | | |
|---|---|---|---|
| EP | 0 399 630 B1 | 11/1990 | |
| JP | 8134509 A | 5/1996 | |
| WO | WO-2010115502 A1 * | 10/2010 | ............... B22F 3/03 |

\* cited by examiner

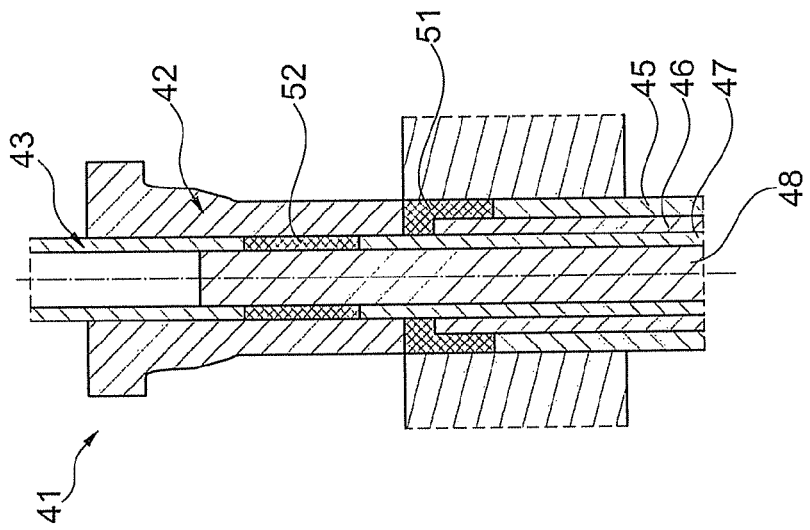
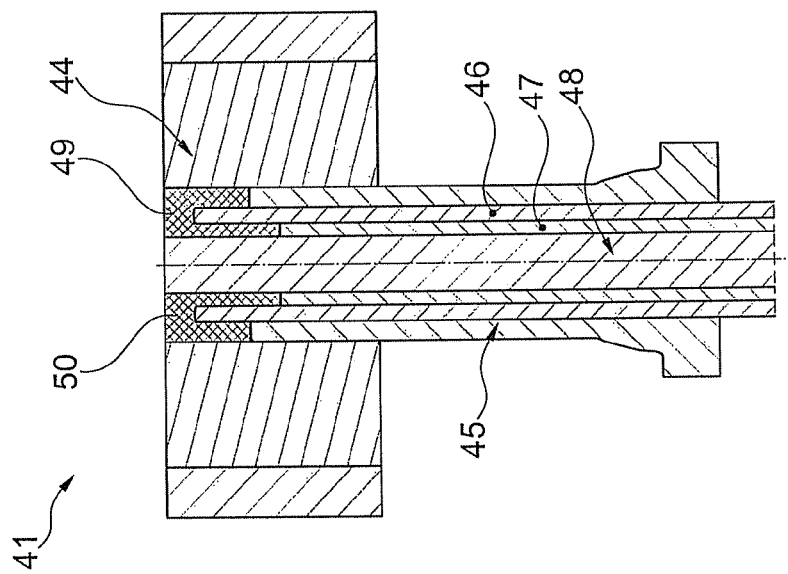
Fig. 5
Fig. 6

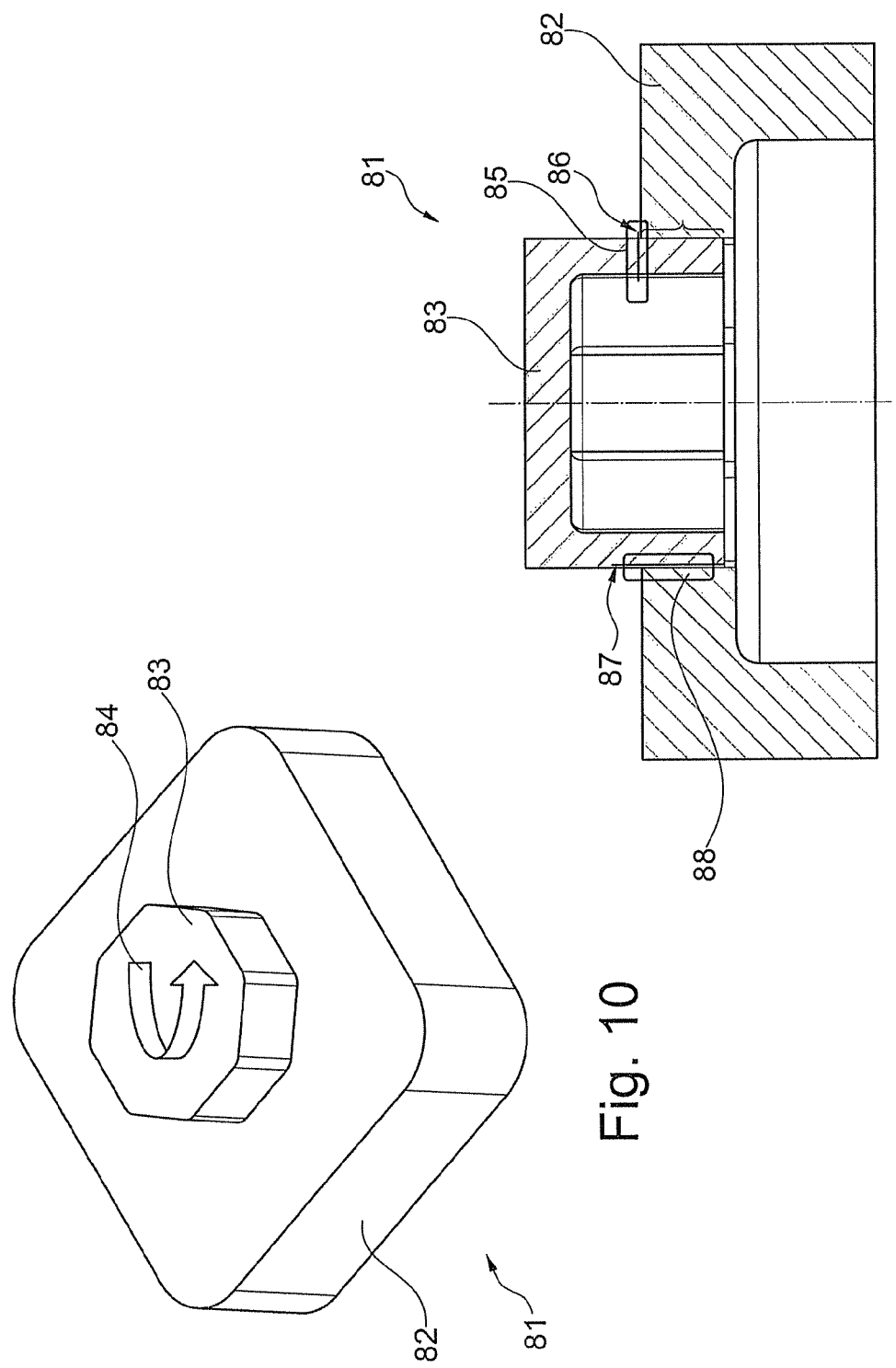

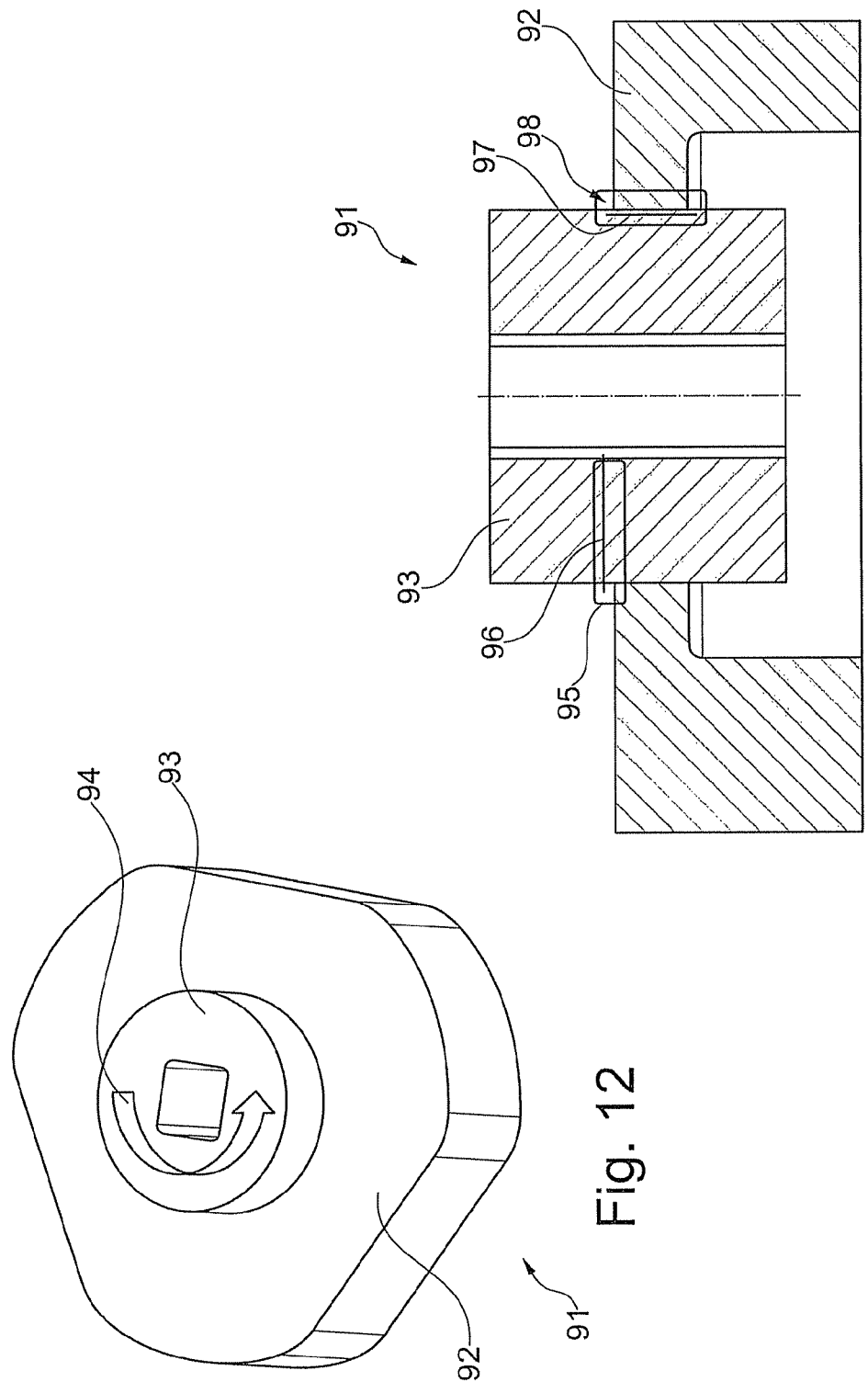

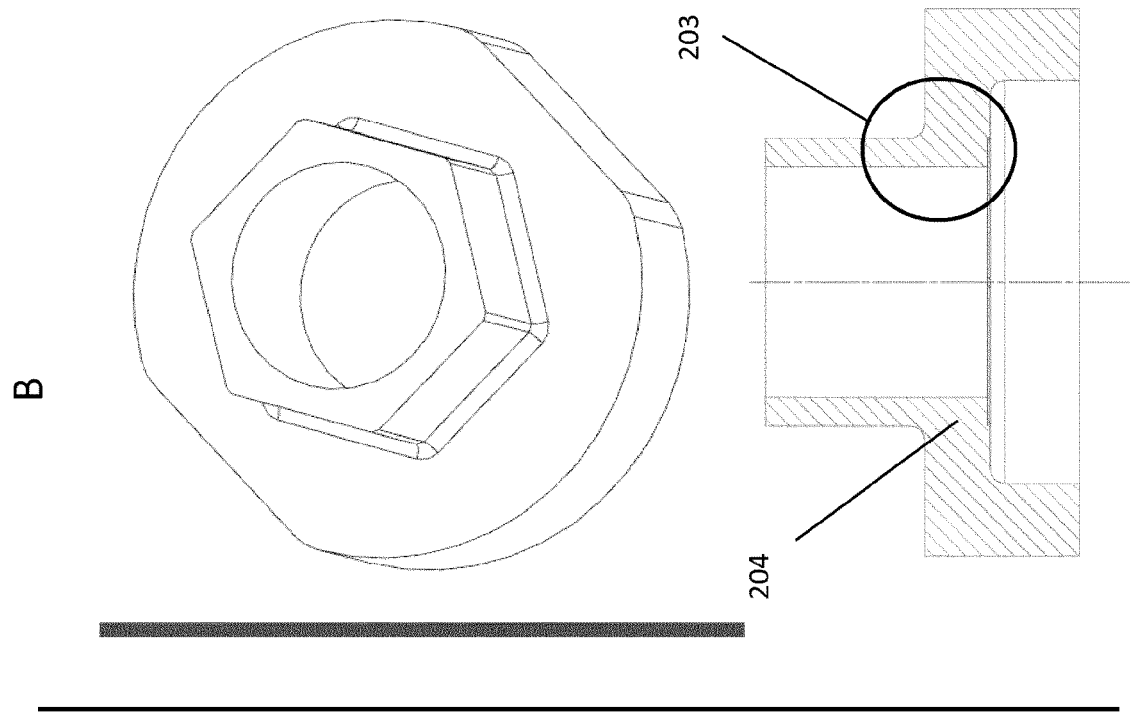
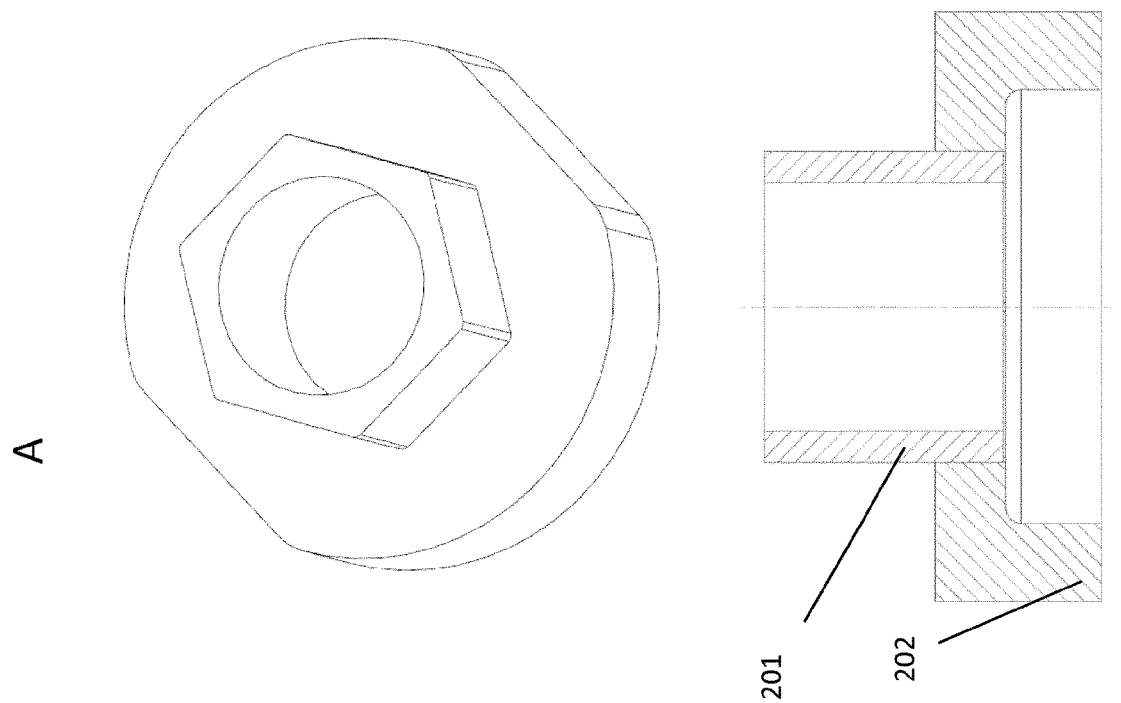
Fig. 21

METHOD AND PRESS FOR PRODUCING A GREEN COMPACT COMPOSITE WITH A PREDETERMINED BREAKING POINT

This application represents the U.S. national stage entry of PCT International Application No. PCT/EP2015/062991 filed Jun. 10, 2015, which claims priority to German Patent Application No. 10 2014 008 169.9 filed Jun. 10, 2014, the disclosures of which are incorporated herein by reference in their entirety and for all purposes.

The invention relates to a method and a press for producing a green product composite having at least a first partial green product and a second partial green product, wherein, within a pressing cycle in the press, a powder is introduced into a filling chamber and is subsequently separated into a first partial amount and a second partial amount, and within the same pressing cycle, the respective partial amounts are pressed in each case homogeneously to form a first partial green product and a second partial green product, and the partial green products are, after the pressing in the press, amalgamated.

EP-B-0 399 630 has disclosed a method for producing a green product composite, wherein a powder material is pre-compacted to form a first green product and, subsequently, a second, separately pre-compacted green product or a solid part is inserted into the press into a cavity of the first green product. Thereafter, the assembled green product is compacted. Green products manufactured in this way, and sintered units produced therefrom, are, both during the compaction itself and during the demolding process and during subsequent handling, at risk of cracking at cross-sectional transitions inter alia owing to density inhomogeneities or axial and radial stresses in the tool.

By way of a method proposed in DE-A-10 2009 042 598, it is sought to avoid the risk of cracking during the pressing process at the transitions of different cross sections of the green product, which arises for example owing to stresses in the tool or uncontrolled powder flow from one cross section into an adjacent cross section. In the case of said method, at least two partial green products are compacted independently of one another, without disruptive influences at cross-sectional change transitions, and are subsequently joined, wherein the compaction of the two partial green products and the subsequent joining are performed in a press tool within a pressing cycle. By way of said method, green product composites and sintered units are produced which have a homogeneous density over the entire green product composite or the sintered unit.

JP-A-08134509 describes a further method for producing a composite of green products composed of different materials. DE-A-10 2009 016 718 describes a sintered unit with a predetermined breaking point which is realized, in terms of construction, by way of selective thickness reduction of the unit. Pressing and sintering of two or more green products does not take place.

During production of a sintered unit which is sintered from at least two partial green products in the green product composite, said known method has the advantage that the unit, owing to the homogeneous density throughout the sintered unit, has no significant, and in particular no predictable, structural weak points owing to density inhomogeneities or prior damage resulting from cracks.

It is an object of the present invention to provide a green product composite which exhibits predictable behavior and which makes it possible here to realize an advantage from the assembly of the green product composite from partial green products, wherein the manufacturing advantage of the use of a single press is maintained.

Advantages features, embodiments and refinements emerge from the following description, from the figures and from the claims, wherein individual features from one embodiment are not restricted thereto. Rather, one or more features from one embodiment may be combined with one or more features from another embodiment to form further embodiments. Also, the wordings of the independent claims in their form as filed should not be understood to constitute a limitation of the subjects to be claimed. One or more features of the wordings may therefore be exchanged and omitted, but likewise additionally supplemented. Also, the features specified on the basis of a specific exemplary embodiment may also likewise be used in generalized form and/or in other exemplary embodiments, in particular uses.

A method for producing a green product composite, having at least a first partial green product and a second partial green product, in a press is proposed, wherein, within a pressing cycle, a powder is introduced into a filling chamber of the press and is subsequently separated into a first partial amount and a second partial amount in the press, and within the same pressing cycle, the respective partial amounts are pressed to form a first partial green product and a second partial green product. It is preferably the case that a different density is achieved in the pressing of the first partial green product than in the pressing of the second partial green product. The partial green products are, after the pressing in the press, amalgamated to form the green product composite, wherein, by way of the amalgamation, an interference fit is formed between the first partial green product and the second partial green product. A predetermined breaking point of the green product composite is formed preferably in a region in the vicinity of the interference fit, preferably outside the interference fit. By way of the joining of the first partial green product to the second partial green product, an interference fit is formed between the first partial green product and the second partial green product. For this purpose, it is provided for example that at least one of the two partial green products has an oversize. It is preferable if only one of the two partial green products has an oversize. A further embodiment provides that the two partial green products may each have an oversize. The respective dimensions of upper and lower plunger are preferably such that, during a respective pressing process of the partial green products, a pressure is built up which the partial green products cannot laterally evade owing to the lateral delimitation by abutting parts of the pressing tool; it rather being the case as a result that, aside from an axial pressure exerted by upper and lower plunger, a radial pressure is also generated which can be utilized to generate the interference fit by joining of the two partial green products. For example, a predetermined breaking point of the green product composite is formed in a region adjacent to the interference fit.

The proposed method provides that the filling of the filling chamber with the powder, the subsequent separation of the powder into the first and the second partial amount, the pressing of the first and second partial green product, the joining of the first partial green product to the second partial green product to form the green product composite and the subsequent removal of the green product composite take place within a pressing cycle. The production of the green product composite is performed by way of a single press which has at least a first lower plunger, a first upper plunger, a second lower plunger and a second upper plunger. The production of the green product composite is particularly preferably performed by way of a single pressing tool. The proposed method provides for the first and the second partial amounts to have the same constituents, that is to say in particular the same powder to be sintered, for example the same powder mixture or powder alloy, wherein the two partial amounts preferably have entirely different densities.

In the case of the invention, at least two partial green products composed of the same powder material and with possibly entirely different densities are pressed in each case homogeneously within a tool, wherein the partial green products are then joined one inside the other under pressure. The joining is subsequently sintered (possibly with a slightly lower strength than the base material). The aim here is for example to set the density of a partial green product such that that component of the unit which corresponds to said partial green product after the sintering fails, at the transition to another component which corresponds to the other partial green product and into which the first component is joined, under the action of the structurally predefined notch effect under predictable conditions. According to the invention, it is not the case that the failure takes place at the joining surface of two components; it is rather the case that the weaker component fails, which is normally the plugged-in component, for example by way of a shearing-off action. According to the invention, it is thus the case after the sintering that no further processing steps for notching or the like are required in order to produce the predetermined breaking point.

According to the invention, it is thus the case, by way of the assembly of the two in each case homogeneously pressed partial green products and the coordination thereof with one another, that a predefinable, defined predetermined break, that is to say a predetermined breaking point, is provided. This is achieved by virtue of in each case two partial green products to be joined to one another being in each case homogeneously compacted. In this way, random material weakenings, such as extremely small cracks or the like, in the partial green products are avoided. Normally, said "material weakenings" are the cause of failure of the later sintered unit. By way of tests, it has been found that one partial green product may be designed so as to be held in a later fully sintered unit securely up to a predefinable force or up to a predefinable torque, and so as to fail only when said force or said torque is exceeded. By way of the homogeneous compaction in the case of the "green-in-green" production according to the invention, it is thus possible to actually predefine a load limit and thus a predetermined breaking point, the precise position of which is possibly not exactly predictable. However, there are no longer deviations with regard to the failure owing to defects in the material or the like or at interfaces, such as was the case in previous assembled partial green products not homogeneously compacted according to the invention. In particular, the risk of crack at a transition point, such as is possible owing to inhomogeneities in the case of normal, conventional manufacture according to the prior art, is prevented. A transition point is in this case to be understood for example to mean the transition, in particular gusset, from a first to a second dimension, in particular from a first to a second diameter, which, with the use of conventional technology for the production of green products, exhibits unpredictable breaks and therefore does not make it possible to reliably permit a predictable predetermined break in the case of sintered units with transitions.

According to the invention, it is furthermore also possible for a unit to be equipped with different predetermined breaks and thus with different predetermined breaking points. It is thus possible for different partial green products with different failure strengths to be joined one inside the other by way of the "green-in-green" production according to the invention. This leads to a sintered unit in which, for example, a first component exhibits a predetermined break when a first load threshold is exceeded, whereas a second component experiences a predetermined break only when a second load threshold, which is higher than the first load threshold, is exceeded. In other words, it is thus possible for a unit produced according to the invention to exhibit at least two predefinable, mutually different predetermined breaks. In general, it is the case here that a unit of said type is then also produced by sintering of a green product composite composed of more than two partial green products.

A refinement provides that the sintered unit has a first and a second predefinable predetermined break which can be triggered at mutually different loads, wherein the first and the second predetermined break are situated in respectively different regions of the sintered unit. This is realized for example by way of a green product composite in which partial green products are joined concentrically with respect to one another and/or are arranged and joined adjacent to one another in a partial green product.

Below, upper and lower plunger are also referred to as pressing plungers. Upper and lower plunger are part of the pressing tool. In particular, it is possible by way of a pressing tool, in particular a pressing plunger, for powder material to be pressed, that is to say compacted, wherein joining of partial green products is also performed by way of the same pressing tool. In a further embodiment of the proposed method, it is provided that, during a separation of the powder into the first and the second partial amount by way of the pressing tool of a pressing plunger, a joining chamber is kept free by way of a pressing plunger. In particular, said joining chamber is at least partially delimited by the first or second partial amount of the powder substance. A joining chamber is to be understood to mean the chamber within a partial amount or a partial green product, into which chamber a further partial green product is joined.

It is particularly advantageous for the partial green products to be pressed in the same tool. In particular, it is possible for at least one partial green product to be pre-compacted and to be re-compacted or finally compacted before or after the joining of the two partial green products to form the green product composite. In a further embodiment, it is provided that the joint green product composite is re-compacted or finally compacted preferably in the same tool. It is particularly advantageously provided that, after the joining of the first partial green product to the second partial green product, the two partial green products are sintered to form the unit without joint re-compaction. Furthermore, aside from the first and second partial green product, at least one further partial green product, for example a third, a fourth or a fifth partial green product, may be pressed and joined within a pressing cycle to form a green product composite.

The pressing plungers are movable relative to one another such that at least the first and second lower and upper plungers can, in a first state of the press, form the filling chamber for the (common or identical) powder for the pressing of the first and of the second partial green product. The first and second lower and upper plungers are preferably, in a second state of the press, arranged relative to one another such that the common powder is present in the form of a first partial amount and in the form of a second partial amount, wherein the first partial amount is separated from the second partial amount.

In a third state of the press, the first and second lower and upper plungers are arranged relative to one another such that a pressed first partial green product is present between the first lower plunger and the first upper plunger and a pressed second partial green product is present between the second lower plunger and the second upper plunger. The pressing is preferably performed such that the first and also the second partial green product are in each case homogeneously compacted. In this context, homogeneously means that as far as possible no density deviation exists within the respective partial green product. Rather, each partial green product has in each case an at least approximately equal density as viewed over the cross section thereof. The density of the first partial green product preferably differs from the density of the second partial green product. In a fourth state of the press, the first partial green product is pressed with the second green product to form a green product composite, wherein an interference fit is formed between the first partial green product and the second partial green product. The interference fit may preferably be varied by way of a plunger clearance between two pressing plungers.

In the proposed method, a time offset may be provided between the third state and the fourth state. In a modification thereof, the joining of the first partial green product to the second partial green product takes place still during the pressing of the first and/or of the second partial green product. At the start of the pressing of the first and/or of the second partial green product, the first partial amount is present separately from the second partial amount, which means that no powder particles of the first partial amount come into contact with other powder particles of the second partial amount.

The separation of the powder into the first and the second partial amount is preferably realized by way of a movement of at least one pressing plunger, of the first and/or second lower plunger and/or upper plunger. In particular, for this purpose, use may be made of a method, and also in principle a press setup, as disclosed in DE-A-10 2009 042 598. The content of said document is incorporated by reference into the subject matter of the present patent application.

In particular, after the separation of the powder into two partial amounts, the pressing plungers form a first working chamber and a second working chamber. A working chamber is to be understood in particular to mean cavities in a pressing tool which can be filled with powder and in which a pressing process or a compaction of the powder can be performed. The working chambers are preferably delimited at least by one pressing plunger. In a refinement, one of the working chambers is delimited by at least two pressing plungers and/or by a die. The first and/or the second working chamber are/is particularly preferably movable within the pressing tool, and preferably, at least one of the working chambers, the first and/or the second working chamber, is moved during the pressing of the first and/or second partial green product.

As proposed, by way of the joining of the first partial green product to the second partial green product, an interference fit is formed between the first partial green product and the second partial green product, wherein a predetermined breaking point of the green product composite is preferably formed in the region of the vicinity of the interference fit. The interference fit between the first and the second partial green product effects mechanical clamping of the partial green products, which holds the green product composite together, which is sufficient for the transfer of the green product composite to the sintering furnace. The partial green products preferably have, in at least a subregion of the contact surfaces, a contact pressure of between 0.1 N/mm² and 100 N/mm², more preferably between 1 N/mm² and 50 N/mm², and particularly preferably between 2 N/mm² and 30 N/mm². The interference fit preferably promotes the sintering of the green product composite, wherein, by way of the interference fit, diffusion processes during the sintering are promoted in relation to a green product composite without an interference fit, for example with cavities between the individual partial green products.

In particular, the interference fit may be effected by way of a plunger clearance between the first lower or upper plunger and the second lower or upper plunger. Here, it is provided that, at least by way of a second lower or upper plunger, a joining chamber is kept free in which the second partial green product is displaced for the purposes of joining to the first partial green product. The pressing plunger which keeps a joining chamber free has, in particular, a slightly smaller diameter than the second partial green product which is joined into the joining chamber. The difference or the oversize corresponds to the plunger clearance between the first lower or upper plunger and the second lower or upper plunger. In one embodiment, the plunger clearance lies between approximately 0.005 mm and approximately 0.025 mm, and in a further embodiment, it lies between approximately 0.025 mm and approximately 0.05 mm.

After the joining of the first partial green product to the second partial green product, the predetermined breaking point of the green product composite is present in a region in the vicinity of the interference fit.

The interference fit may in particular be situated in a plane which extends perpendicular to the joining direction, wherein the joining direction is predefined by a relative movement of the first partial green product relative to the second partial green product during the joining to form the green product composite. In said plane, the interference fit has a width and a length oriented perpendicular to the width. The region in which the predetermined breaking point of the green product composite is arranged may preferably be predefined by way of the proposed method. In an embodiment, the region extends from the interference fit in a direction away from the interference fit and parallel to the joining direction as far as a distance which amounts to one tenth of the value of the square root of the product of the length and of the width of the interference fit. In a further embodiment, said spacing amounts to one fifth of the value of said square root, and in a modified embodiment in relation thereto, the spacing amounts to one third of the value of said square root.

In an advantageous embodiment of the method, an interference fit is generated which is formed firstly parallel to the joining direction and secondly for example in circular form, or in the form of a hexagon, in a plane perpendicular to the joining direction.

It is furthermore provided that, during the pressing of the first partial green product and during the pressing of the second partial green product, two partial green products with a different density are formed. In a further embodiment of the method, the green product composite is sintered to form a unit, wherein a predetermined breaking point of the unit is formed preferably in a region in the vicinity of the interference fit of the green product composite.

The predetermined breaking point of the green product composite is particularly advantageously arranged at the same location as the predetermined breaking point of the sintered unit. Here, the predetermined breaking point of the green product composite however fails at a considerably lower failure load than the predetermined breaking point of the sintered unit.

It is particularly advantageously provided that the green product composite and/or the sintered unit has a first component composed of the first partial green product with a first density and a second component composed of the second partial green product with a second density which is greater than the first density. The predetermined breaking point of the green product composite and/or of the sintered unit is preferably arranged in the first component with the first, relatively low density.

In an embodiment, a density difference between the first and the second partial green product in the green product composite amounts to at least 0.1 g/cm$^3$ or greater. A deviation of a respective homogeneous density between first and second partial green product preferably lies between 0.1 g/cm$^3$ and 1.3 g/cm$^3$. In the case of a sintered unit, it is the case in an embodiment that the density difference between the first and the second component amounts to at least 0.1 g/cm$^3$, preferably at least 0.5 g/cm$^3$. An embodiment provides, in the case of a sintered unit having a first and a second component composed of the first and the second partial green product respectively, that the density difference lies between 0.1 g/cm$^3$ and 1.1 g/cm$^3$. For example, the first component may have a density in a range between 6.8 and 7.4 g/cm$^3$, and the second component may have a density between 6.2 and 7.0 g/cm$^3$.

The first density and the second density can in particular be categorized into individual SINT classes, in particular different SINT classes. Materials for sintered molded parts are, in terms of their characteristics and designations, standardized in material performance specifications conforming to DIN 30910. Here, for the categorization of the materials, different density classes, that is to say SINT classes, are used. The density classes comprise inter alia the density classes A, B, C, D and E, wherein A denotes the density class with the lowest density and E denotes the density class with the highest density, and the classes A, B, C, D and E have increasing densities in the stated sequence.

It is particularly advantageously possible for a failure load of the sintered unit and/or of the green product composite at which the sintered unit and/or the green product composite fails at the predetermined breaking point to be achieved by way of a reproducible density difference between the first and the second density. In a preferred embodiment, the difference amounts to one SINT class, that is to say the first density may for example be assigned to the density class A and the second density may be assigned to the density class B, or the first density may be assigned to the density class C and the second density may be assigned to the density class D. In a further embodiment, the density difference has two SINT classes, that is to say the first density may for example be assigned to the density class A and the second density may be assigned to the density class C, or the first density may be assigned to the density class C and the second density may be assigned to the density class E. Correspondingly, density differences of up to three, four or five SINT classes are also possible.

Furthermore, the partial green product or the component with the relatively low density and the predetermined breaking point may be arranged in the interior of the green product composite and/or sintered unit, whereas the exterior of the green product composite and/or of the sintered unit has a relatively high density, preferably without a predetermined breaking point. A further embodiment provides, by contrast, that the partial green product and/or the component with the relatively low density and the predetermined breaking point is arranged at the exterior of the green product composite and/or sintered unit, whereas a relatively high density, preferably without a predetermined breaking point, is present in the interior of the green product composite and/or of the sintered unit. Depending on the green product composite and/or sintered unit, it is also possible for some other geometrical arrangement, also a varying arrangement along an extent of the unit and/or of the green product composite, to be provided. As an alternative to a single predetermined breaking point, it is also possible for two or more predetermined breaking points to be provided. For example, in each case at least one predetermined breaking point may be provided in different planes and/or at different extents of a sintered unit and/or of a green product composite. This may be advantageous for example in the case of a unit which is subjected to different forces and moments from different directions.

The density difference between the first and the second partial green product is preferably set by way of a control unit which controls the positions of the pressing plungers during the introduction of the powder into the filling chamber and during the separation of the powder into the first and second partial amounts. The density difference may preferably be converted, by way of the density of the pore-free powder before the pressing, into a direct SINT class difference. Such a conversion is however reliably possible only if the two partial green products have a very homogeneous density distribution, in particular if the first partial green product is pressed separately from the second partial green product, and preferably both partial green products are pressed and joined within the same pressing cycle.

The failure load at the predetermined breaking point is preferably specified as a failure tensile stress, failure shear stress and/or failure pressure. Furthermore, the failure load may also be specified as an equivalent stress, in particular as a von Mises equivalent stress.

It is particularly preferably the case in the proposed method that, two partial green products with a predefined density difference are produced in a manner dependent on the failure load at the predetermined breaking point at which the sintered unit or the green product composite fails at the predetermined breaking point.

For example, it is possible, in the case of a von Mises equivalent stress of approximately 300 N/mm$^2$, for a density difference of one SINT class to be selected, that is to say the first density is for example assigned to the SINT class B and the second density is assigned to the SINT class C. In a further embodiment, in the case of, for example, a von Mises equivalent stress of approximately 500 N/mm$^2$, the first density may be assigned to the SINT class C and the second density may be assigned to the SINT class D, and in a further exemplary embodiment, in the case of a von Mises equivalent stress of approximately 600 N/mm$^2$, the first density may be assigned to the SINT class E and the second density may be assigned to the SINT class F, which preferably has tempered metal powder alloys. To realize a tempered sintered unit, it is for example possible for bromine, manganese, vanadium, tungsten and/or molybdenum to be introduced into the powder. Such precipitation hardening is also possible in the case of the SINT classes A, B, C, D and E. It is preferably also the case in this configuration that the first partial green product and the second partial green product have the same alloy, which is however compacted with different levels of intensity.

Furthermore, a method for configuring a sintered unit or green product composite with a predefined failure load for a predetermined breaking point is proposed, wherein the green product composite is produced by way of the proposed method. The method for configuration comprises the following steps: in a first step, a first unit or a first green product composite is produced. In a second step, the unit and/or the green product composite is subjected to load to the point of failure of the unit and/or of the green product composite. In a third step, said failure load is detected. The failure load is preferably detected in the form of a tensile and/or shear stress and/or a pressure load. This may be performed for example by way of at least one strain gauge on the green product composite or the sintered unit. In a fourth step, a deviation of the detected failure load from the predefined failure load is detected. If the deviation exceeds a predefined tolerance value, then in a fifth step, at least one parameter is varied in order to achieve a different density for example of a first or second partial green product of the green product composite during the execution of the method according to the invention. For example, a predefined force on a pressing plunger during the pressing of the first or second partial green product may be varied. One of the steps 1 to 5, particularly preferably all of the steps 1 to 5, are repeated until the detected deviation reaches and/or falls below the predefined tolerance value.

Said unit production method has the advantage over a casting method in particular that the unit is defined with a predefined predetermined breaking point, in particular with regard to location and failure load at which the predetermined breaking point is intended to be destroyed, not by way of the shaping of the unit alone. Rather, by way of a variation which is performed during the pressing process of the first or of the second partial green product, a density difference between the first and the second partial green product can be set, which density difference corresponds to a predefined failure load for the predetermined breaking point of the fully sintered unit. It is also possible in this way for very lightweight units to be manufactured with the same shape but differently dimensioned predetermined breaking points, that is to say with predetermined breaking points with in each case different predefined failure loads, without the need here to change and/or exchange the tool of the press.

Furthermore, a green product composite is proposed which has a first partial green product and a second partial green product, wherein the first partial green product and the second partial green product are connected by way of an interference fit. The first and the second partial green product are composed in each case of the same powder. The first and the second partial green product are in each case homogeneously compacted and have different densities, and a predetermined breaking point is provided in that partial green product which has the relatively low density. A predetermined breaking point is provided preferably in the vicinity of the interference fit. It is furthermore preferable for the proposed green product composite to be produced by way of a method and/or a press as described in more detail above and/or below.

Furthermore, a sintered unit is proposed, having a first component and a second component which are joined together and are sintered to form the unit, wherein the first component has a density which differs from the density of the second component, and wherein that one of the two components which has a relatively low density has a predetermined breaking point, and has said predetermined breaking point in particular owing to the relatively low density. The sintered unit is preferably produced as a green product composite as described in more detail above and also below.

Furthermore, the use of a sintered unit is proposed, wherein the unit is in the form of a structural element of a machine. The structural element can be destroyed under the action of a predefined failure load at the predetermined breaking point. Furthermore, the sintered unit may be used as part of an adapter which can be destroyed under the action of a predefined failure load at the predetermined breaking point. The adapter may in particular be suitable for the fixing of machine parts by screw connection.

In an advantageous refinement, it is provided that the unit is in the form of a structural element of a bodyshell, preferably of a motor vehicle, and can be destroyed under the action of a one-off load in the form, for example, of a tensile stress, compressive stress and/or shear stress with a predefinable minimum value at the predetermined breaking point (e.g. screws for the fastening of shafts with a controlled torque). In particular, the unit may have a safety function in the event of the motor vehicle being involved in a collision. An example here is a unit for a steering wheel locking means which must fail, that is to say yield, in a defined manner in the event of a collision.

Furthermore, the unit may be in the form of a part of a tension device, preferably of a cable pull device, and may be capable of being destroyed under the action of a one-off tensile stress load involving an exceedance of a predefinable value at the predetermined breaking point.

A further use provides for the unit to be in the form of a structural element of an engine block or of an energy accumulator and to be capable of being destroyed under the action of a one-off load with a predefinable value of a tensile stress, compressive stress and/or shear stress at the predetermined breaking point. The predetermined breaking point is advantageously oriented such that a part of an engine block or energy accumulator slides under the passenger compartment of the motor vehicle in the event of the motor vehicle being involved in a collision. It is also possible for the unit to be in the form of a structural element of a gearbox shaft or of a drive shaft.

Also proposed is a press having a control unit and having a pressing tool for producing a green product composite. The green product composite comprises at least a first partial green product and a second partial green product, wherein the first partial green product is pressed together with the second partial green product. The pressing tool has at least a die, a first upper plunger, a first lower plunger, a second upper plunger and a second lower plunger. The first and/or the second upper and lower plungers respectively are movable relative to one another, wherein the first and second upper and lower plungers, in a first state, form a common filling chamber for a common powder for production of the first and of the second partial green product. In a second state of the first and second lower and upper plungers, the powder is present separately in the form of a first partial amount and in the form of a second partial amount. In a third state of the first and second lower and upper plungers, a pressed first partial green product is present between the first lower plunger and the first upper plunger and a pressed second partial green product is present between the second lower plunger and the second upper plunger, wherein the control unit predefines a first pressing pressure between the first upper plunger and the first partial amount and a second pressing pressure between the second upper plunger and the second partial amount, wherein the first partial green product and the second partial green product are pressed with in each case different density, and an amalgamation of the first partial green product with the second partial green product to form a green product composite is realized by way of movement of the plunger pairs controlled by the control unit, wherein, after the amalgamation, an interference fit is formed between the first partial green product and the second partial green product, and a predetermined breaking point of the green product composite is formed in a region in the vicinity of the interference fit.

In an advantageous embodiment of the press, it is provided that the first upper plunger and the second lower plunger are arranged adjacent to one another along a line of action of a pressing force of the first upper plunger, wherein the first upper plunger and the second lower plunger have in each case a first pressing surface and a second pressing surface which run parallel to one another and which are oriented obliquely with respect to at least one pressing surface of the first lower plunger and/or of the second upper plunger. In a refinement, the first pressing surface of the first upper plunger and the second pressing surface of the second lower plunger may also be oriented perpendicular to at least one pressing surface of the first lower plunger and/or of the second upper plunger.

A further embodiment of the press provides for the control unit to have a memory in which position regulation at least of a first or second lower or upper plunger in relation to the pressing tool is stored as a function of the magnitude of a predefined failure load of a predetermined breaking point. For example, in a manner dependent on a density of the first or second partial green product to be achieved in the pressing process, a particular position of the first or second lower or upper plunger shortly before the start of the pressing process in relation to the pressing tool may be stored. It is also possible for an absolute distance of the first or second lower plunger from the first or second upper plunger before the start of the pressing process of the first or second partial green product to be stored. The position regulation preferably comprises the relative position of the first or second lower or upper plunger relative to the tool, or an absolute distance of the first or second lower plunger from the first and/or second upper plunger in each case before the start of the pressing process of the first or second partial green product, as a setpoint value during the movement of the pressing plunger before the start of the pressing process.

It is furthermore also possible for a subsequent surface processing and/or treatment to be provided, for example by way of coating or the like. A surface is preferably motivated to undergo oxidization. This makes it possible, for example, to realize a greater force resistance along with increased brittleness. It is preferably the case that at least that surface of that component which is intended to predictably fail is for example subjected to pretreatment with superheated steam.

Further advantageous embodiments and features will emerge from the following figures and from the associated description. The individual features which emerge from the figures and from the description are merely exemplary and do not restrict the respective embodiment. It is rather possible for one or more features from one or more figures to be combined with other features from the above description to form further embodiments. Therefore, the features are specified not in a limiting manner but in an exemplary manner. In detail:

FIG. 1 shows a perspective view of a sintered unit,

FIG. 2 shows a perspective view of a first partial green product and a second partial green product, FIG. 3 shows a sectional view of the sintered unit from FIG. 1, FIG. 4 shows a sectional view of a pressing tool, FIG. 5 shows a sectional view of the pressing tool in a first state, FIG. 6 shows a sectional view of the pressing tool in a second state, FIG. 7 shows a sectional view of the pressing tool in a third state, FIG. 8 shows a sectional view of the pressing tool in a fourth state, FIG. 9 shows a sectional view of the pressing tool in a fifth state, FIG. 10 shows a further embodiment of a sintered unit produced in accordance with the proposed method, FIG. 11 shows the unit from FIG. 10 in a sectional view, FIG. 12 shows a further embodiment of a sintered unit produced in accordance with the proposed method, FIG. 13 shows the unit from FIG. 12 in a sectional view, FIG. 14 shows a further refinement of a sintered unit produced in accordance with the proposed method, FIG. 15 shows a further refinement of a sintered unit produced in accordance with the proposed method, FIG. 16 shows a further refinement of a sintered unit produced in accordance with the proposed method, FIG. 17 shows a further refinement of a sintered unit produced in accordance with the proposed method, FIG. 18 shows a further refinement of a sintered unit produced in accordance with the proposed method, FIG. 19 shows a further refinement of a sintered unit produced in accordance with the proposed method, FIG. 20 shows a further refinement of a sintered unit produced in accordance with the proposed method, FIGS. 21 to 25 show a comparison, and photographs, of an unpredictable crack characteristic in the case of conventional technology, and FIGS. 26 to 29 show further embodiments of a sintered unit equipped with at least two predictable predetermined breaks.

FIG. 1 shows a sintered unit 1 having a first part 3 and a second part 2 which are integrally connected to one another. The first part 3 is in the form of a hexagon and is suitable for the engagement of a wrench. In the usage situation illustrated in FIG. 1, the first part 3 of the sintered unit 1 is subjected to a torque 4. The torque 4 may preferably, in the installed state of the sintered unit 1, be dissipated at a first side surface 5 and at a second side surface 6, which is concealed in FIG. 1, wherein the sintered unit 1 is braced by way of the side surfaces 5 and 6 against a further unit, for example against a wheel rim of a motor vehicle.

FIG. 2 shows a first partial green product 11 and a second partial green product 12. The second partial green product 12 is, in this exemplary embodiment, of hexagonal shape. The hexagonal shape is formed by way of six planar side surfaces such as the side surfaces 13 and 14, along with the side surfaces 15, 16, 17 and 18 that are not visible in the illustration. The side surfaces 13, 14, 15, 16, 17 and 18 preferably have the same height and width. To form an interference fit during the joining of the first partial green product 11 to the second partial green product 12, the first partial green product 11 has six side surfaces, such as the side surfaces 23, 24, 25, 26, 27 and 28, wherein the side surfaces 23, 24, 25 and 28 are concealed in the perspective view illustrated in FIG. 2.

Likewise, the side surfaces 23, 24, 25, 26, 27 and 28 have the same height and width. To form an interference fit between the first partial green product 11 and the second partial green product 12, the side surfaces 23, 24, 25, 26, 27 and 28 have a length 29 which corresponds approximately to a length 19 of the side surface 14, wherein, in a preferred embodiment, the length 29 is smaller than the length 19 by an oversize for generating an interference fit. The oversize may lie in the range from approximately 0.005 to approximately 0.05 mm.

FIG. 3 shows the sintered unit 1 with the first part 3 and the second part 2 in a sectional view. The torque 4 acting on the first part 3, as indicated in FIG. 1, is transmitted by way of at least one contact surface 31 to the second part 2. According to the invention, the sintered unit 1 has a predetermined breaking point 32 in a region 33, wherein the region 33 encompasses an interference fit 34 which is formed between the first partial green product 11 and the second partial green product 12 during the joining of the first partial green product 11 to the second partial green product 12. FIG. 3 duly illustrates the sintered unit 1, but the dimensions of the sintered unit 1 substantially correspond to the dimensions of a green product composite which has the first partial green product 11 and the second partial green product 12, aside from shrinkage of the partial green products 11 and 12 arising as a result of the sintering process. The distance 36 of the predetermined breaking point 32 from the interference fit 34 of the green product composite may amount to approximately one thirtieth of the height 35 of the interference fit 34.

FIG. 4 shows a sectional view of a pressing tool 41 having a first upper plunger 42 and a second upper plunger 43, a die 44, a first lower plunger 45, a second lower plunger 46, a third lower plunger 47 and a mandrel 48. The mandrel 48 and the respective pressing plungers are arranged relative to one another such that, in the position of the pressing tool 41 shown in FIG. 4, they hold the first partial green product 11 and the second partial green product 12 separate from one another.

FIG. 5 shows the pressing tool 41 in a first state, wherein the first lower plunger 45, the second lower plunger 46, the third lower plunger 47 and the mandrel 48 are arranged relative to one another such that they form a common filling chamber 49 which is delimited to the outside by the die 44. In a first step of the proposed method, a powder 50 is introduced into said filling chamber 49.

FIG. 6 shows the pressing tool 41 in a second state. In said second state of the pressing tool 41, the pressing plungers 42, 43, 45, 46 and 47 and the mandrel 48 are arranged relative to one another such that the common powder 50, which in the first state of the pressing tool 41 has filled the entire filling chamber 49, is present in the form of a first partial amount 51 and a second partial amount 52, wherein the first partial amount 51 is separated from the second partial amount 52.

FIG. 7 shows the pressing tool 41 in a third state, wherein the first upper plunger 42, the second upper plunger 43, the first lower plunger 45, the second lower plunger 46 and the third lower plunger 47 are arranged relative to one another such that a pressed first partial green product 11 is present between the first upper plunger 42 and the first lower plunger 45 and the second lower plunger 46 and the third lower plunger 47. In particular, the first partial green product 11 is pressed by way of the first upper plunger 42 and the first lower plunger 45 and the second lower plunger 46, and is laterally delimited during the pressing by the die 44 and by a sidewall 61 of the third lower plunger 47. Furthermore, in the third state of the pressing tool, the second upper plunger 43 and the third lower plunger 47 are arranged such that the second partial green product 12 is present in pressed form between said two pressing plungers. During the pressing, the second partial green product 12 is delimited by an outer surface 62 of the mandrel 48 and by an inner surface 63 of the first upper plunger 42.

FIG. 8 shows the pressing tool 41 in a fourth state, in which the pressing plungers 42, 43, 45, 46, 47 and the mandrel 48 are arranged relative to one another such that the first partial green product 11 has been pressed together with the second partial green product 12 to form a green product composite 71, wherein an interference fit 72 is formed between the first partial green product 11 and the second partial green product 12. In a particular embodiment of the proposed method, the partial green product 11 and/or the partial green product 12 may also be pressed and/or re-compacted during the joining.

FIG. 9 shows the pressing tool 41 in a fifth state, in which the first upper plunger 42 and the second upper plunger 43 and the lower plunger 45 have been moved upward and the mandrel 48 and the lower plunger 47 have been moved downward, such that the green product composite 71 is released. In said state of the pressing tool, the green product composite 71 can be gripped, for example by way of a gripping tool, and transported to a sintering furnace.

FIGS. 5 to 9 illustrate the individual steps of a pressing cycle such as the introduction as per FIG. 5, the separation of the powder 50 into a first partial amount 51 and a second partial amount 52 as per FIG. 6, the compaction of the respective partial amounts 51 and 52 to correspondingly form the first partial green product 11 and the second partial green product 12 as per FIG. 7, the joining of the first partial green product 11 to the second partial green product 12 to form a green product composite 71, and the release and/or discharge of the green product composite 71. A pressing cycle comprises at least said five steps. According to the invention, the pressing of the first partial green product 11 and of the second partial green product 12 and the joining of the two partial green products 11 and 12 to form the green product composite 71 are performed within one pressing cycle within the same pressing tool 41. Furthermore, it is provided according to the invention that the interference fit 82 is formed during the joining of the first partial green product 11 to the second partial green product 12 and a predetermined breaking point 73 of the green product composite 71 is formed in a region 74 in the vicinity of the interference fit 72.

The method according to the invention furthermore provides that the pressing process of the first partial green product 11 and of the second partial green product 12 and the subsequent joining of the two partial green products 11 and 12 is performed such that the predetermined breaking point 73 of the green product composite 71 is situated in each case in the same region 74 of the produced green product composites in a repeatable manner, preferably in a series production context. This may be achieved in particular by virtue of the partial amounts 51 and 52 being pressed to form partial green products 11 and 12 with different density. Preferably, the first partial green product 11 has a first density and the second partial green product 12 has a second density, wherein the second density may be lower than the first density.

The predetermined breaking point is preferably situated in a first part of the green product composite in which the density is lower than in a second part of the green product composite, in which the density is relatively high. It is advantageously possible to set a failure load, which is predefined for example by a predefined equivalent stress, in particular a von Mises equivalent stress, by way of a density difference between the first density and the second density.

Here, the density difference may preferably amount to one SINT class. In a further embodiment, the density difference may amount to two SINT classes, and in a modified embodiment, said density difference may amount to three SINT classes. For example, the first partial green product 11 may be assigned to a SINT class D, and the second partial green product 12 may be assigned to a SINT class C, wherein, in this case, the density difference amounts to one SINT class. In a second embodiment of the method, the two partial green products 11 and 12 are compacted such that, after the compaction, the first partial green product 11 can be assigned to the SINT class D and the second partial green product 12 can be assigned to the SINT class B, wherein, in this case, the density difference amounts to two SINT classes. If the density difference has two SINT class steps, it is thus possible, for example, to realize a relatively low failure load of the fully sintered unit in relation to a method in which the density difference between the first partial green product 11 and the second partial green product 12 amounts to only one SINT class.

Through the setting of a targeted density difference, it is also possible for the position of the predetermined breaking point to be influenced. For example, in the case of a small density difference, which amounts to for example only one SINT class, it is possible for the predetermined breaking point to be positioned closer to the interference fit 72 than in the case of a method in which the density difference amounts to two SINT classes. In general, it is then also possible for a density difference between the first partial green product 11 and the second partial green product 12 to be provided with a smaller graduation than one full SINT class, for example one hundredth, one tenth, one fifth or one half of one SINT class density range, wherein a SINT class density range is defined by the lower density and the upper density of the corresponding SINT class.

FIG. 10 shows a further embodiment of a sintered unit 81, which has a first part 83 and a second part 82. The unit 81 is preferably designed such that a torque 84 can be applied to the first part 83.

FIG. 11 shows the unit 81 in a sectional view, wherein a predetermined breaking point 86 of the unit 81 is arranged in the first part 83 in a region 85. In particular, the unit 81, in a first embodiment, has the predetermined breaking point 86 in the region 85, wherein the density difference between the first part 83 and the second part 82 amounts to approximately two SINT classes or more. For example, the first part 83 of said embodiment may be assigned to the SINT class B, and the second part 82 may be assigned to the SINT class D. In a second embodiment that differs therefrom, the unit 81 may have a predetermined breaking point 87 which is arranged in a region 88. In said embodiment, the density difference between the first part 83 and the second part 82 preferably amounts to approximately one SINT class. For example, the first part 83 may be assigned to the SINT class B and the second part 82 may be assigned to the SINT class C.

FIG. 12 shows a further embodiment of a sintered unit 91 with a first part 93 and a second part 92, wherein a torque 94 can be applied in the interior of the first part 93.

FIG. 13 shows the unit 91 in a sectional view, wherein a predetermined breaking point 96 of the unit 91 is arranged in the first part 93 in a region 95. In particular, the unit 91, in a first embodiment, has the predetermined breaking point 96 in the region 95, wherein the density difference between the first part 93 and the second part 92 amounts to approximately two SINT classes or more. For example, the first part 93 of said embodiment may be assigned to the SINT class B, and the second part 92 may be assigned to the SINT class D. In a second embodiment that differs therefrom, the unit 91 may have a predetermined breaking point 97 which is arranged in a region 98. In said embodiment, the density difference between the first part 93 and the second part 92 preferably amounts to approximately one SINT class. For example, the first part 93 may be assigned to the SINT class B and the second part 92 may be assigned to the SINT class C.

FIG. 14 shows a perspective view and a sectional view of a further embodiment of a sintered unit 101 which is produced by way of the method according to the invention and which has a first part 103 and a second part 102, wherein a torque 104 can be applied to the outer edge of the second part 102. The predetermined breaking point is situated in a region 105, preferably in the first part 103.

FIG. 15 shows a perspective view and a sectional view of a further embodiment of a sintered unit 111 which is produced by way of the method according to the invention and which has a first part 113 and a second part 112, wherein a tensile force 114 can be applied to the outer edge of the first part 113. The predetermined breaking point is situated in a region 115, preferably in the first part 113.

FIG. 16 shows a perspective view and a sectional view of a further embodiment of a sintered unit 121 which is produced by way of the method according to the invention and which has a first part 123 and a second part 122, wherein a tensile force 124 can be applied to the outer edge of the first part 123. The predetermined breaking point is situated in a region 125, preferably in the first part 123. In this embodiment, the action of the predetermined breaking point can be intensified by way of a notch effect at the transition from the first part 123 to the second part 122.

FIG. 17 shows a perspective view and a sectional view of a further embodiment of a sintered unit 131 which is produced by way of the method according to the invention and which has a first part 133 and a second part 132, wherein a shear force can be applied to a sidewall of the first part 133. The predetermined breaking point is situated in a region 135, preferably in the first part 133. In this embodiment, the predetermined breaking point fails by way of a shear crack.

FIG. 18 shows a perspective view and a sectional view of a further embodiment of a sintered unit 141 which is produced by way of the method according to the invention and which has a first part 143 and a second part 142, wherein a lateral force 144 can be applied to the first part 143, which is of elongate form in relation to the second part 142. The predetermined breaking point is situated in a region 145, preferably in the first part 143. In this embodiment, the predetermined breaking point fails as a result of a bending stress exceeding a failure load of the unit 141.

FIG. 19 shows a perspective view and a sectional view of a further embodiment of a sintered unit 151 which is produced by way of the method according to the invention and which has a first part 153 and a second part 152, wherein a torque 154 can be applied to the outer edge of the second part 152. The predetermined breaking point is situated in a region 155, preferably in the first part 153. In this embodiment, the action of the predetermined breaking point can be intensified by way of a notch effect owing to the encircling notch 156.

FIG. 20 shows a perspective view and a sectional view of a further embodiment of a sintered unit 161 which is produced by way of the method according to the invention and which has a first part 163 and a second part 162, wherein a torque 164 can be applied to the outer edge of the second part 162. The predetermined breaking point is situated in a region 165, preferably in the first part 163. In this embodiment, the action of the predetermined breaking point can be intensified by way of a notch effect, preferably by way of an engagement of a torque support 166.

In the exemplary embodiments in FIGS. 14 to 20, the parts 103, 113, 123, 133, 143, 153 and 163 in each case have lower densities than the parts 102, 112, 122, 132, 142, 152 and 162, wherein the position of the respective predetermined breaking point is realized in the parts with the relatively low density, that is to say the parts 103, 113, 123, 133, 143, 153 and 163. In the case of units which are produced by sintering of a green product composite having more than two partial green products, it is also possible for multiple predetermined breaking points to be formed, which fail under the action of different loads.

FIG. 21 shows a comparison of an identical unit A, B, as has already been described above, produced and sintered in each case from powder material, which unit has in one case been produced in accordance with the green-in-green method described above (unit A) for creating the in each case homogeneously pressed partial green products, and has in another case been produced by way of conventional technology (unit B). Whereas, in the case of unit A, in each case two homogeneous bodies 201, 202 are in each case homogeneous in themselves, which makes it possible for example to utilize different densities, unit B has no partial bodies, but rather has a single integrated body 203, which in the transitions 204 has in each case critical regions characterized by inhomogeneities and microcracks. The latter do not permit reliable predictability with regard to a fracture of the unit B. The problem of uncontrollable microcracks and inhomogeneities is illustrated on the basis of the following FIGS. 22 to 25, which show various cracks produced in a unit B by way of conventional technology.

FIG. 22 shows a brittle crack at a transition of the unit B at the top left, as occurs as a result of the release of load in the press in the case of conventional green product production, and which leads either directly, or only at a later point in time, to a complete, uncontrollable and unpredictable failure of the unit. Such a brittle crack may exist undiscovered within the unit, but later leads to failure during use as a result of crack growth, even though the actually calculated torque action for this has not yet been applied.

Figure 1:
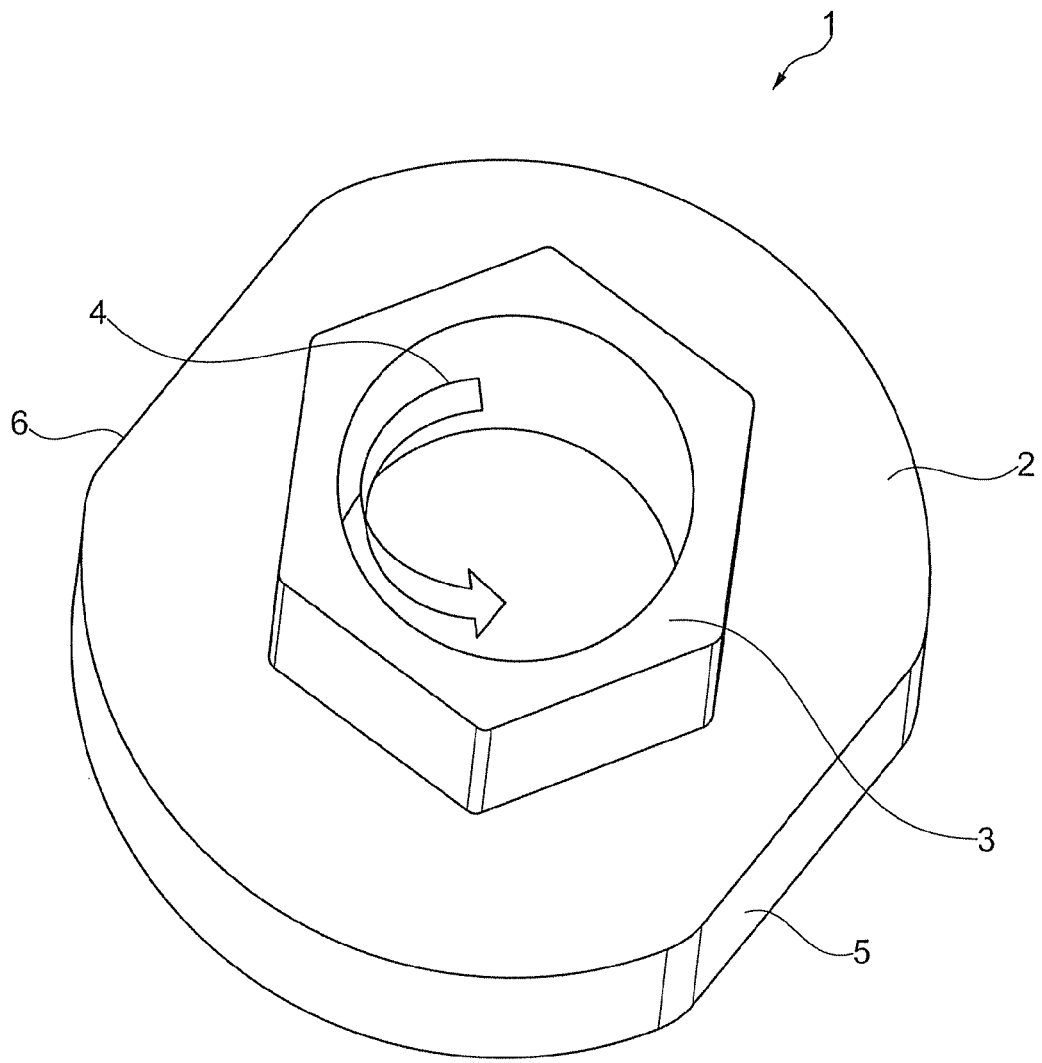
Figure 2:
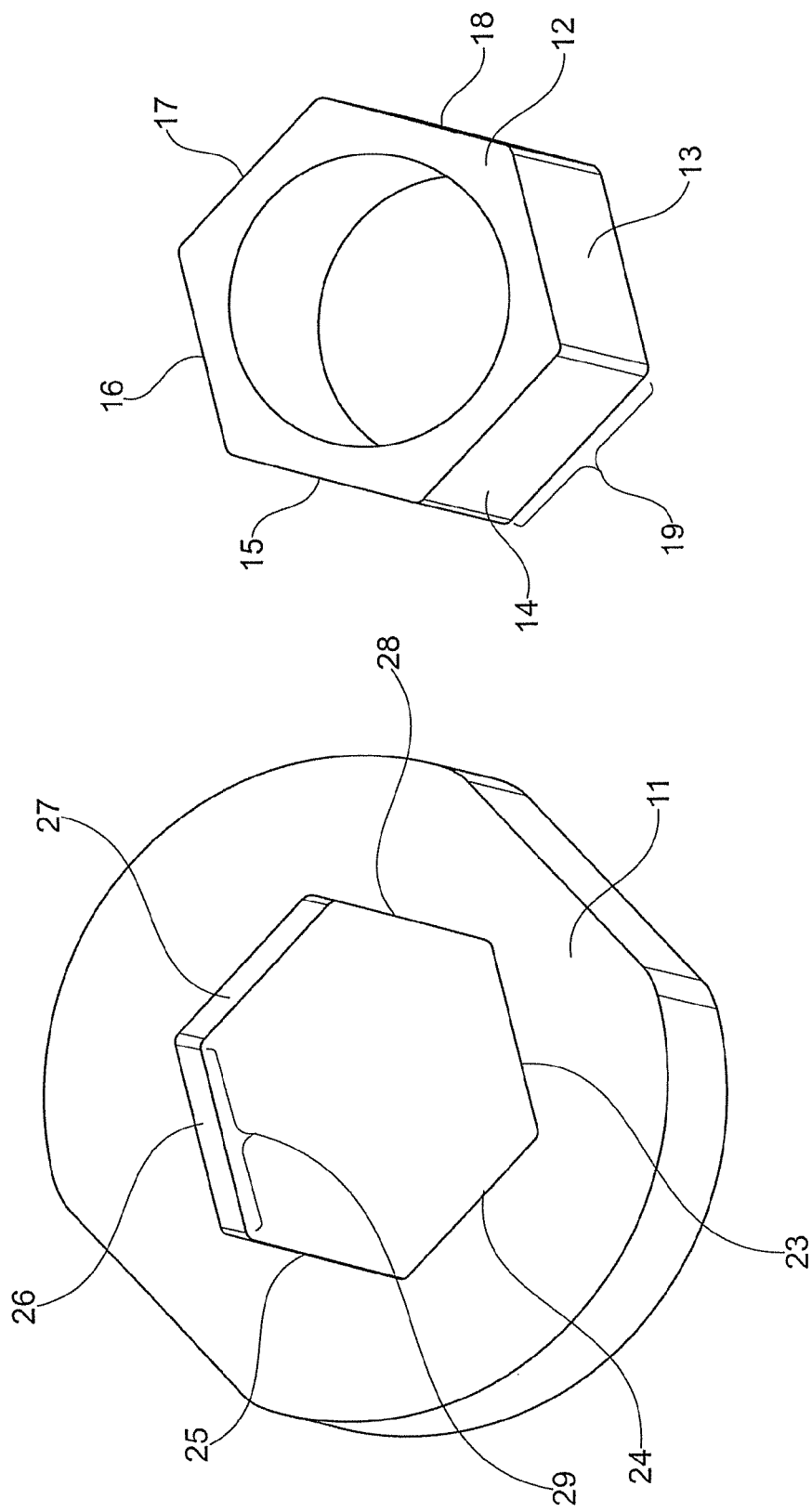
Figure 3:
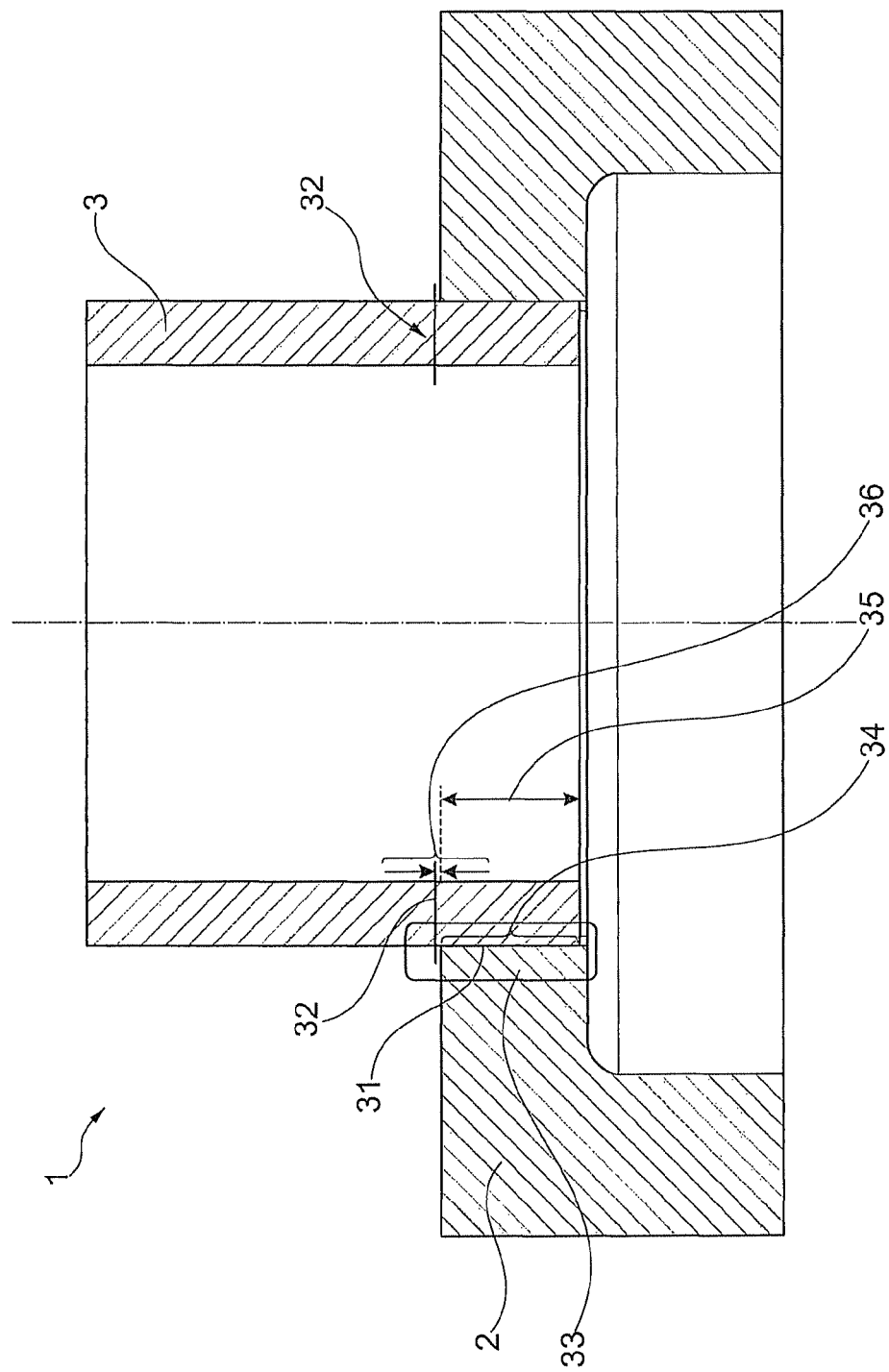
Figure 4:
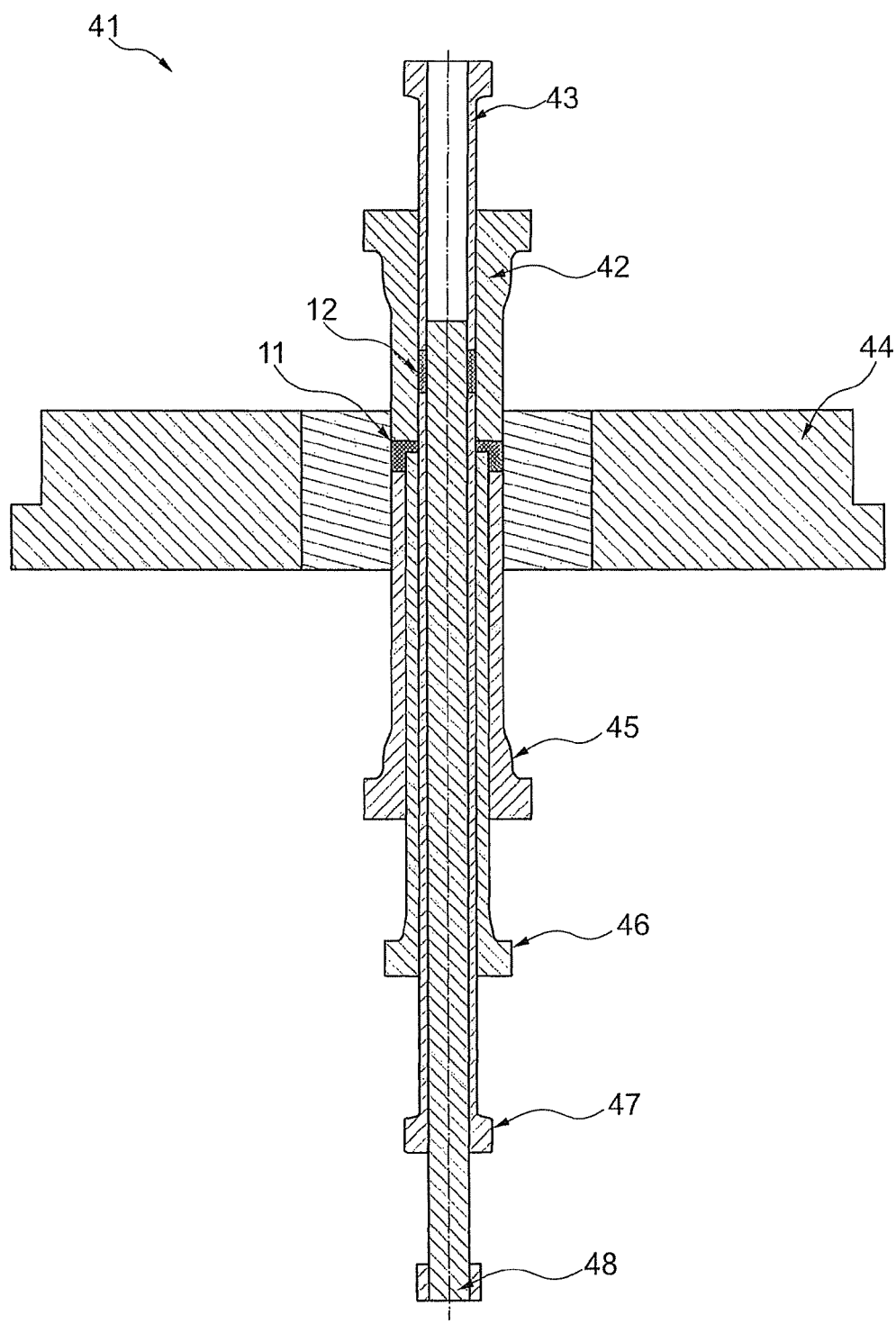
Figure 9:
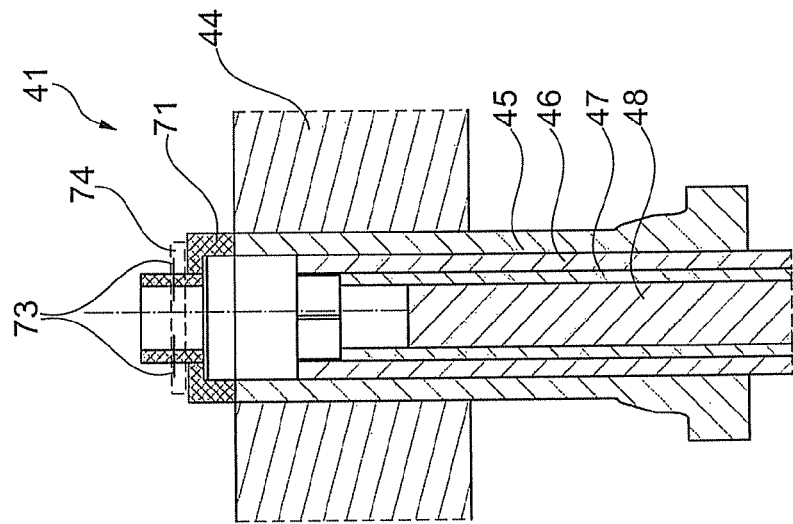
Figure 8:
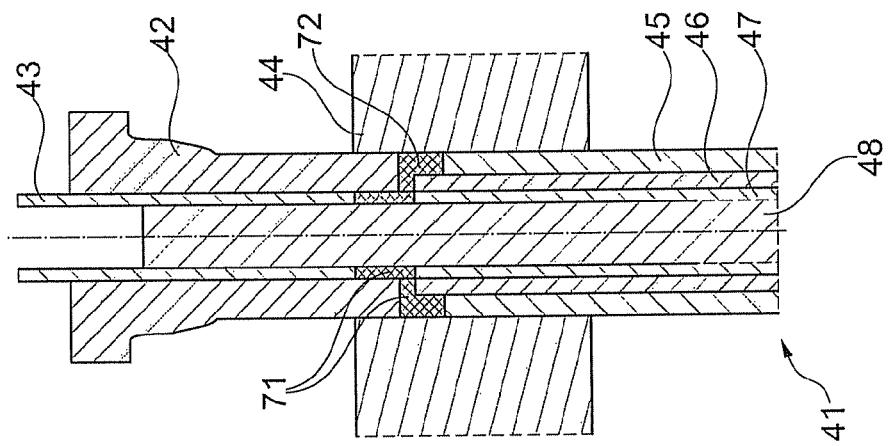
Figure 7:
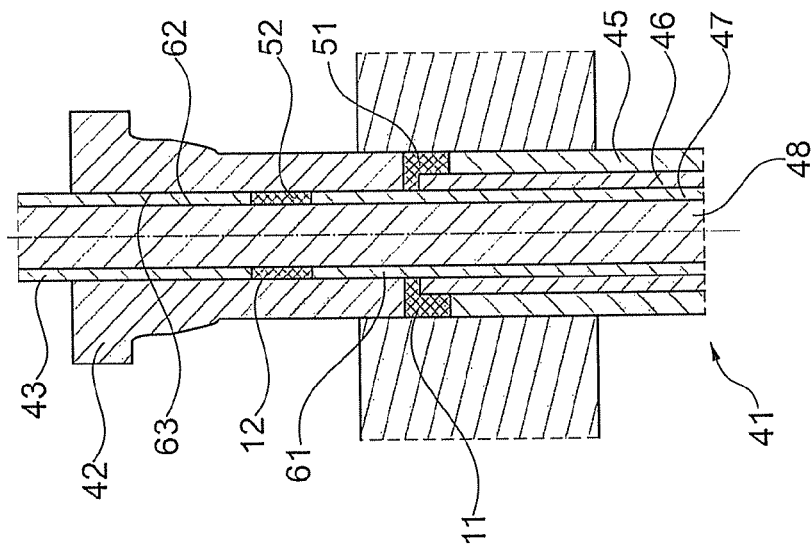
Figure 14:
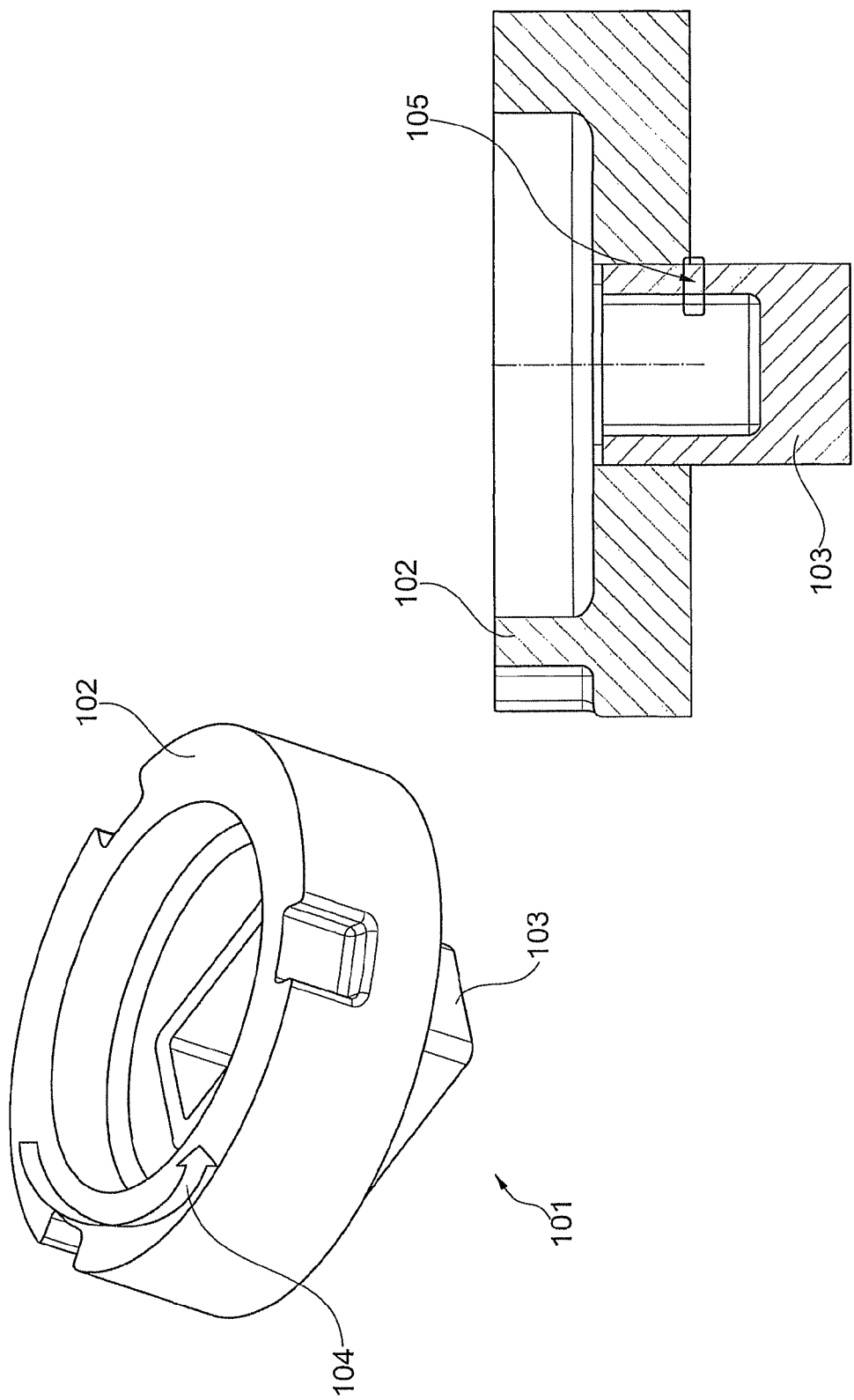
Figure 15:
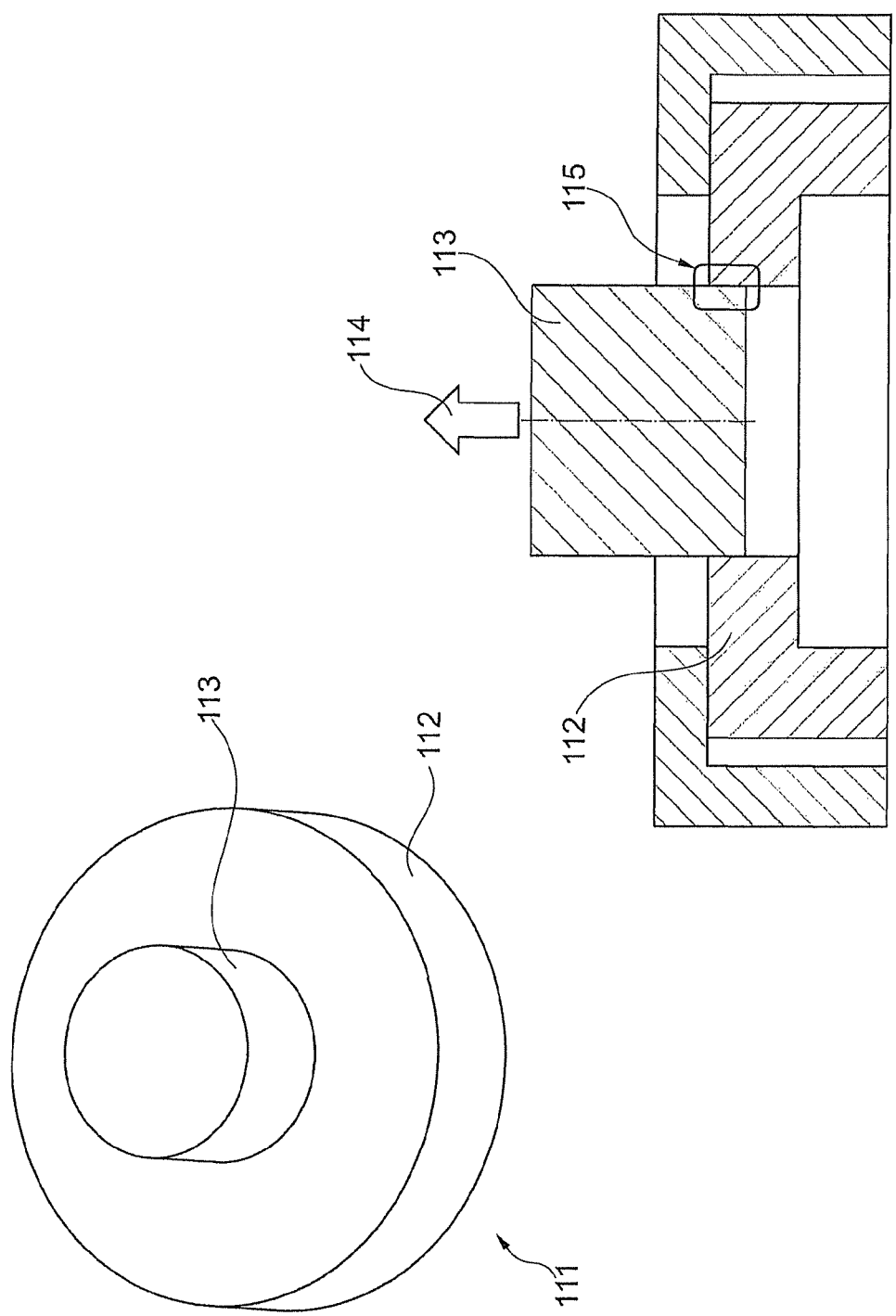
Figure 16:
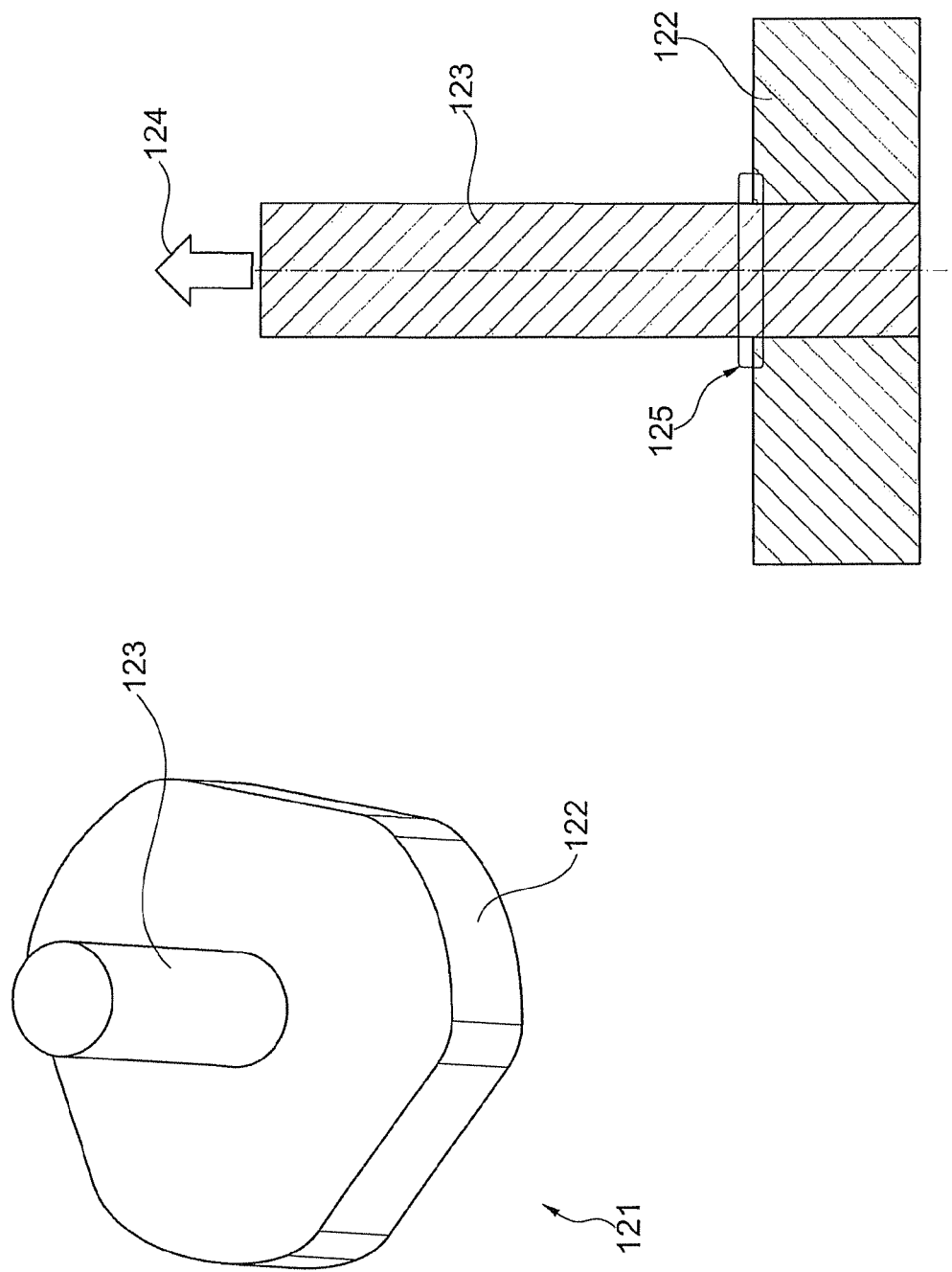
Figure 17:
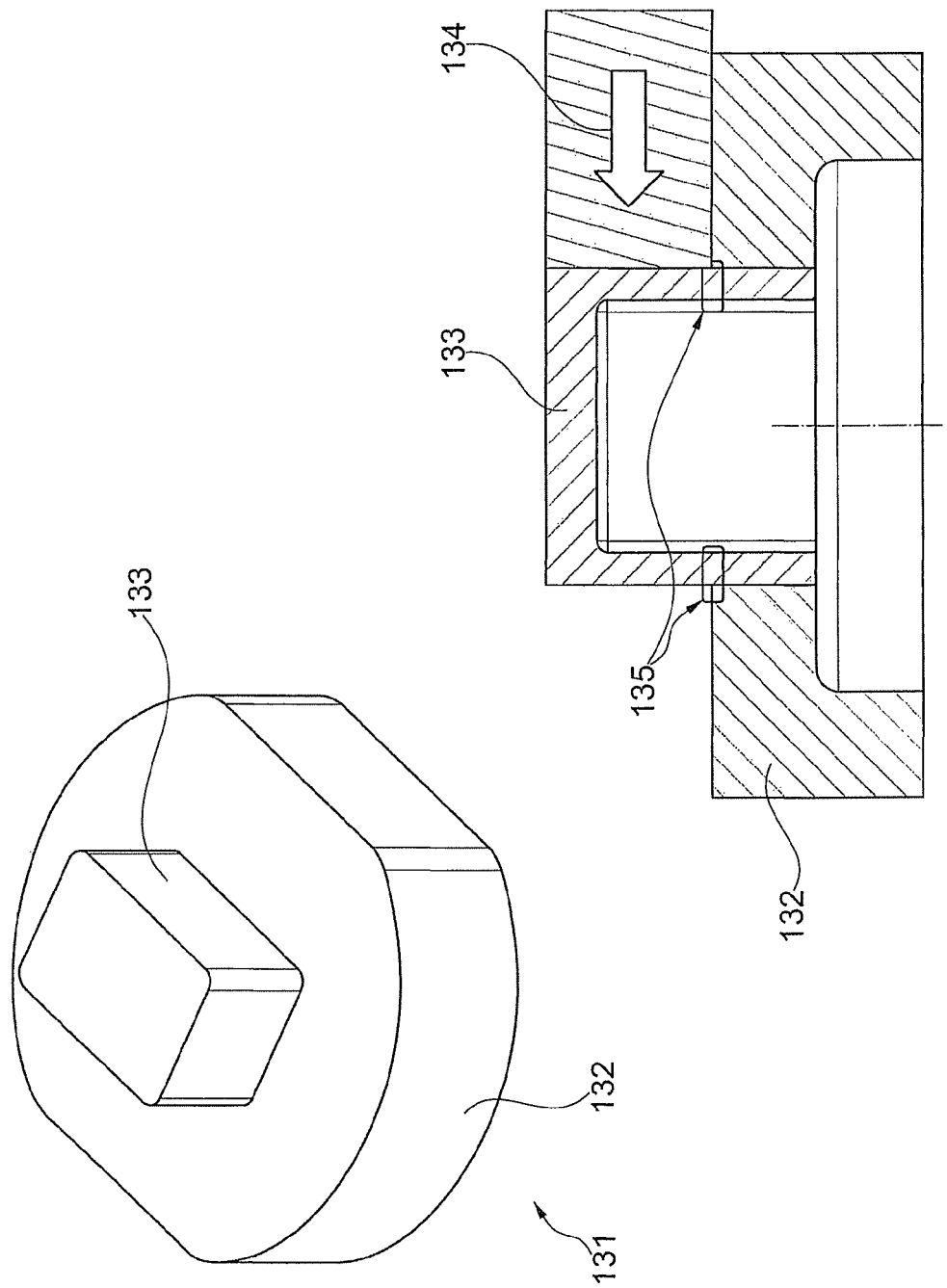
Figure 18:
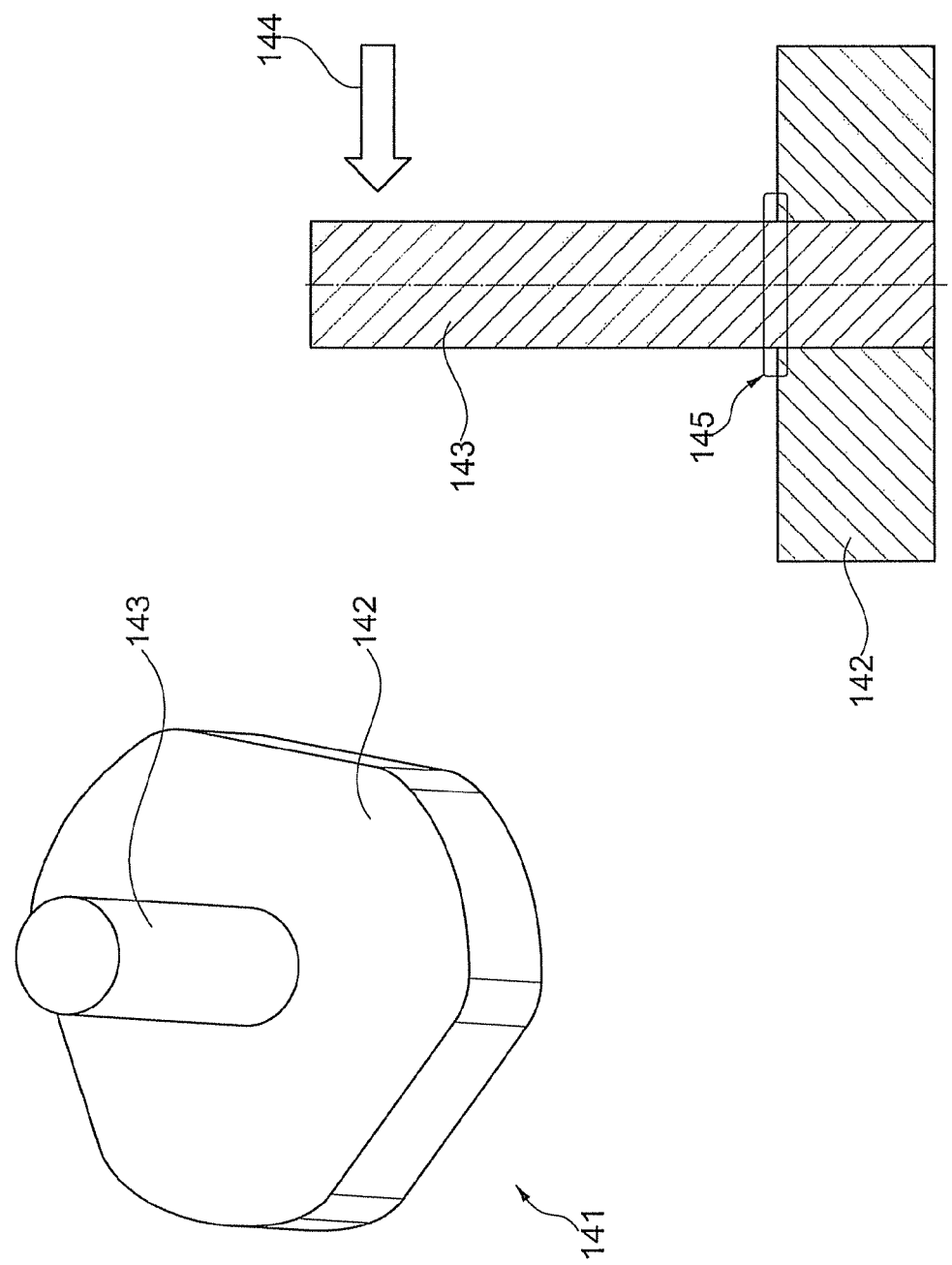
Figure 19:
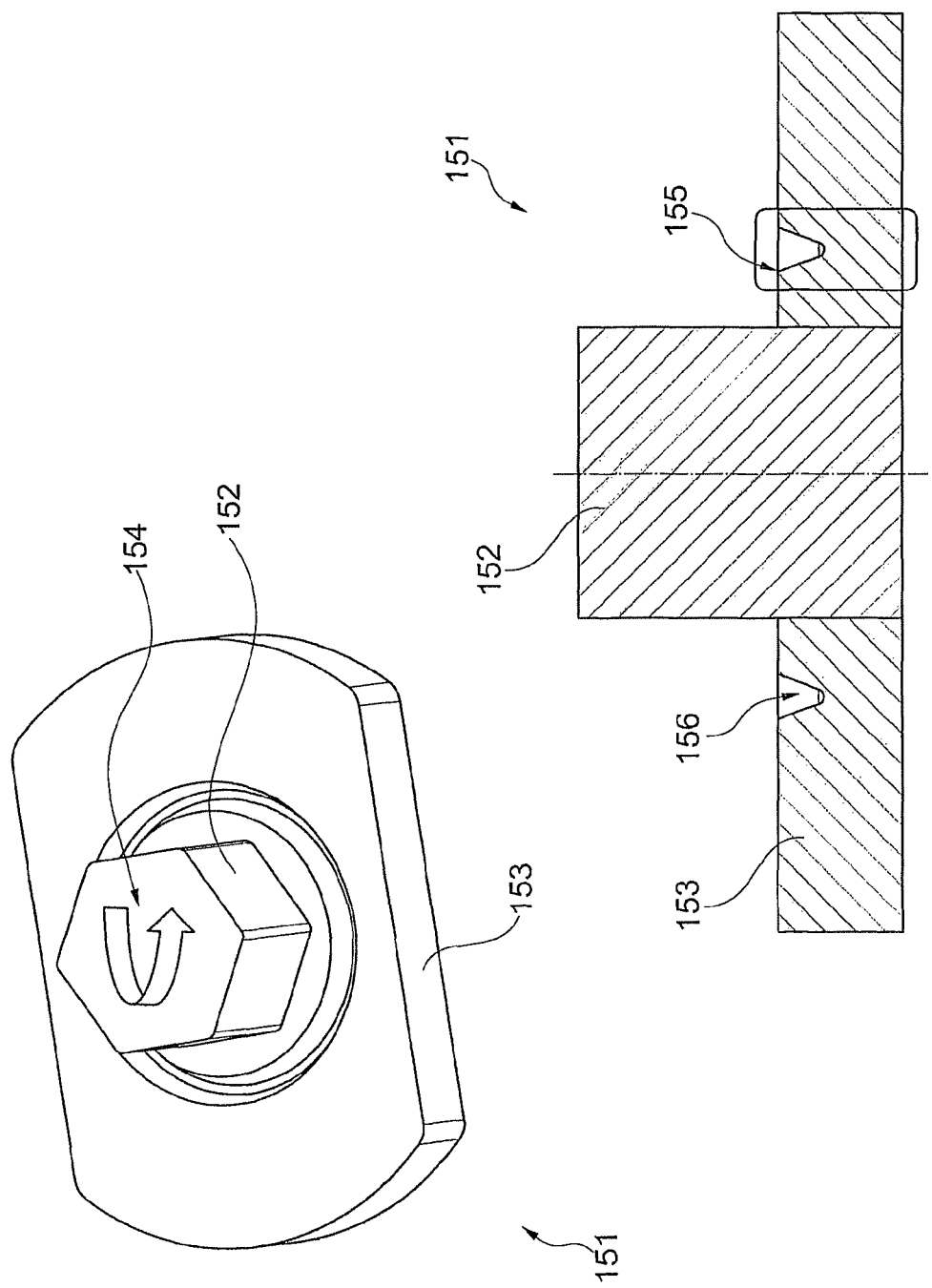
Figure 20:
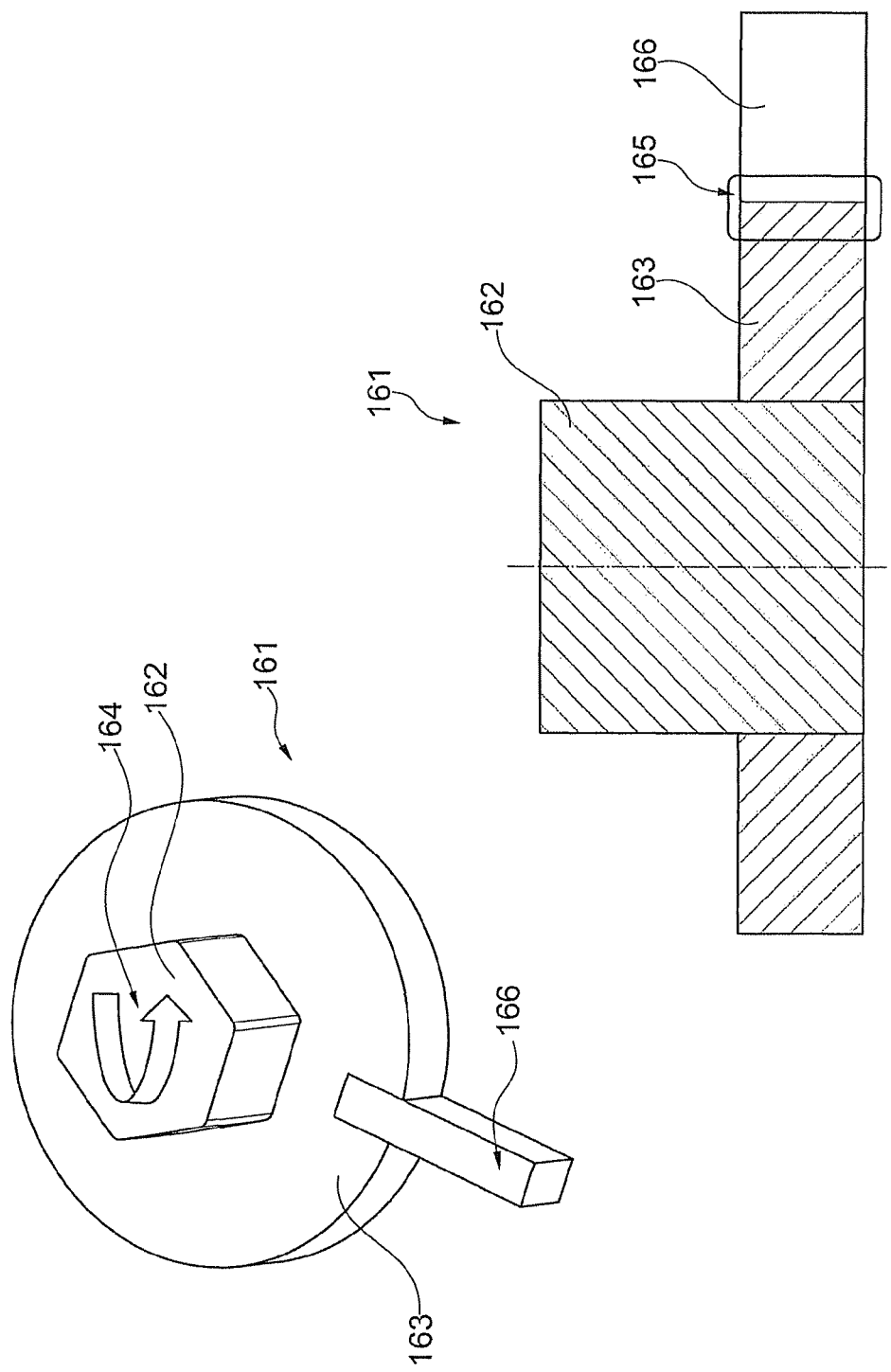
Figure 22:
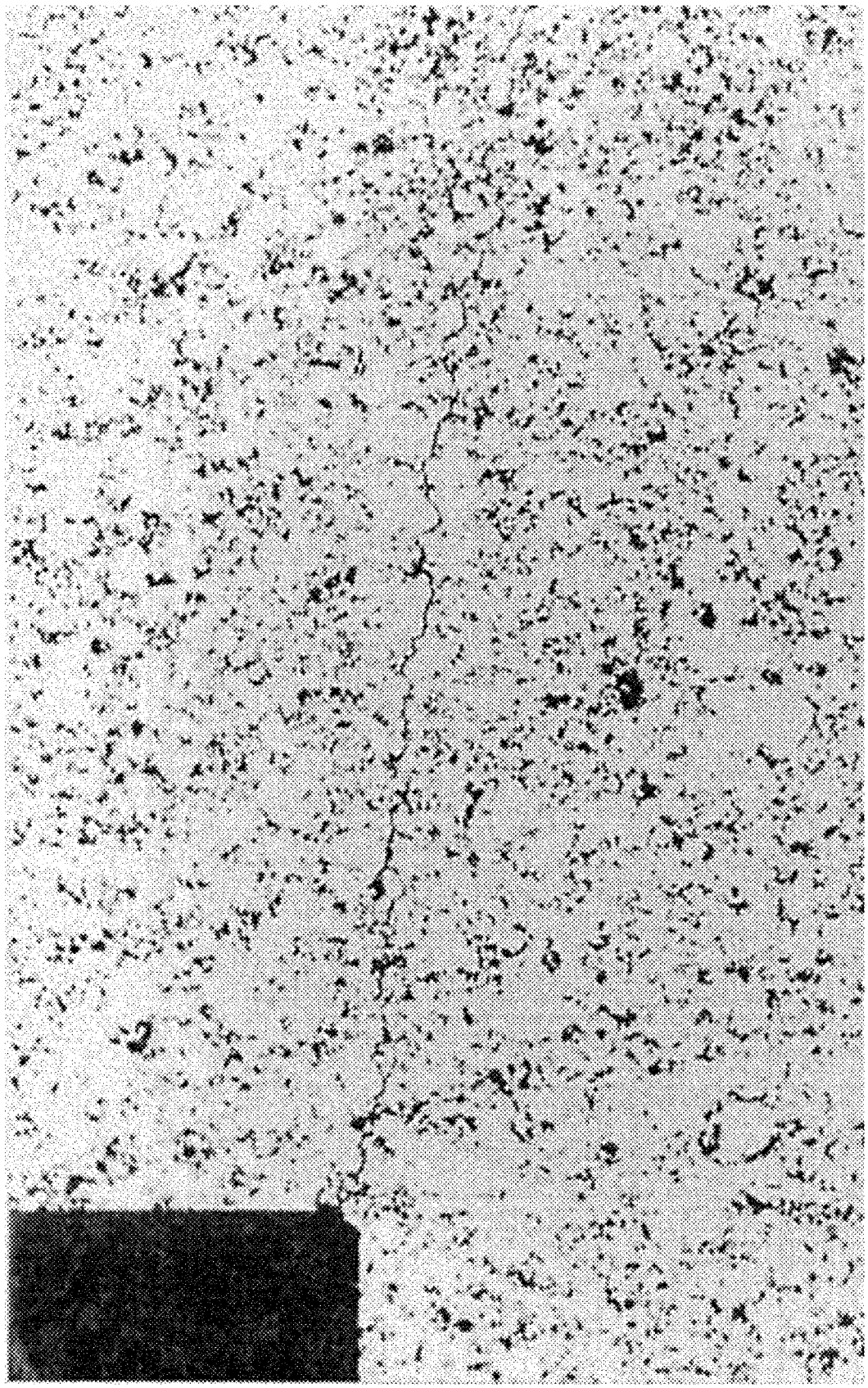
Figure 23:
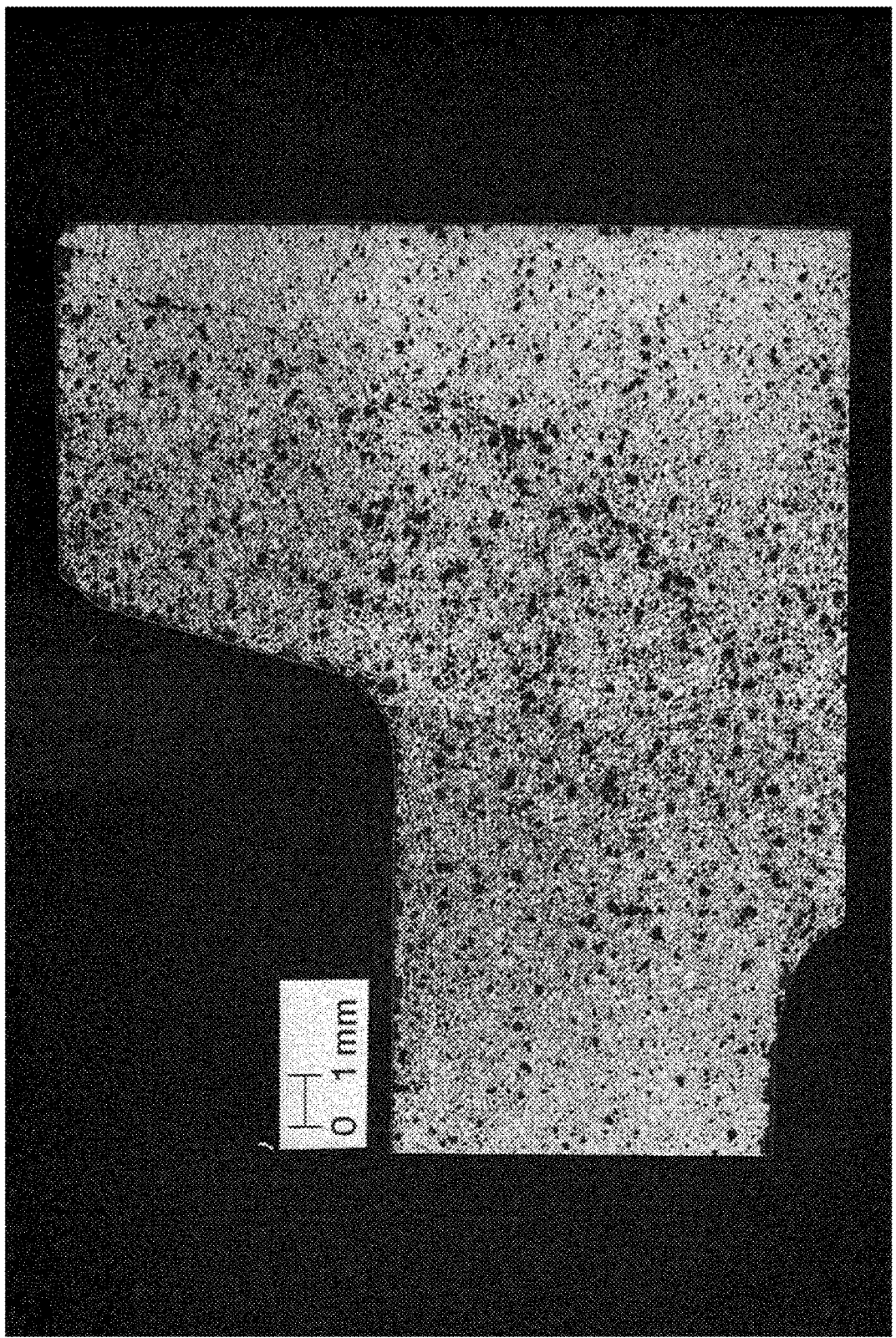
FIG. 23 shows a grinding pattern through a green product of a unit B, in the case of which firstly an uncontrollable dead-water crack and secondly also a shear crack have been identified in the case of the conventional production technology being used.
Figure 24:
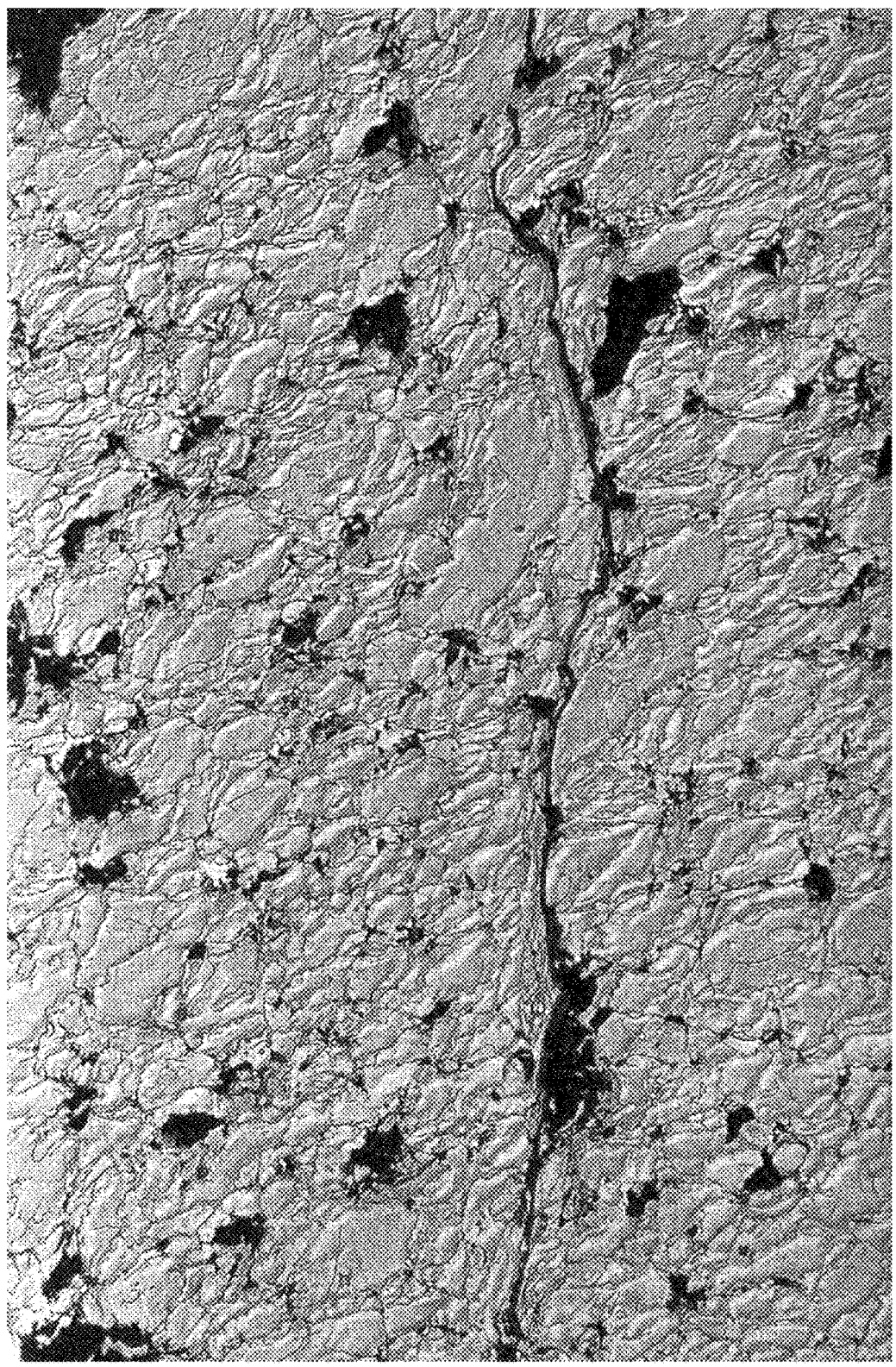
FIG. 24 shows a further grinding pattern through a green product of the unit B. Here, a shear crack has been found within the microstructure, said shear crack being caused by inhomogeneities owing to deformed particles.
Figure 25:
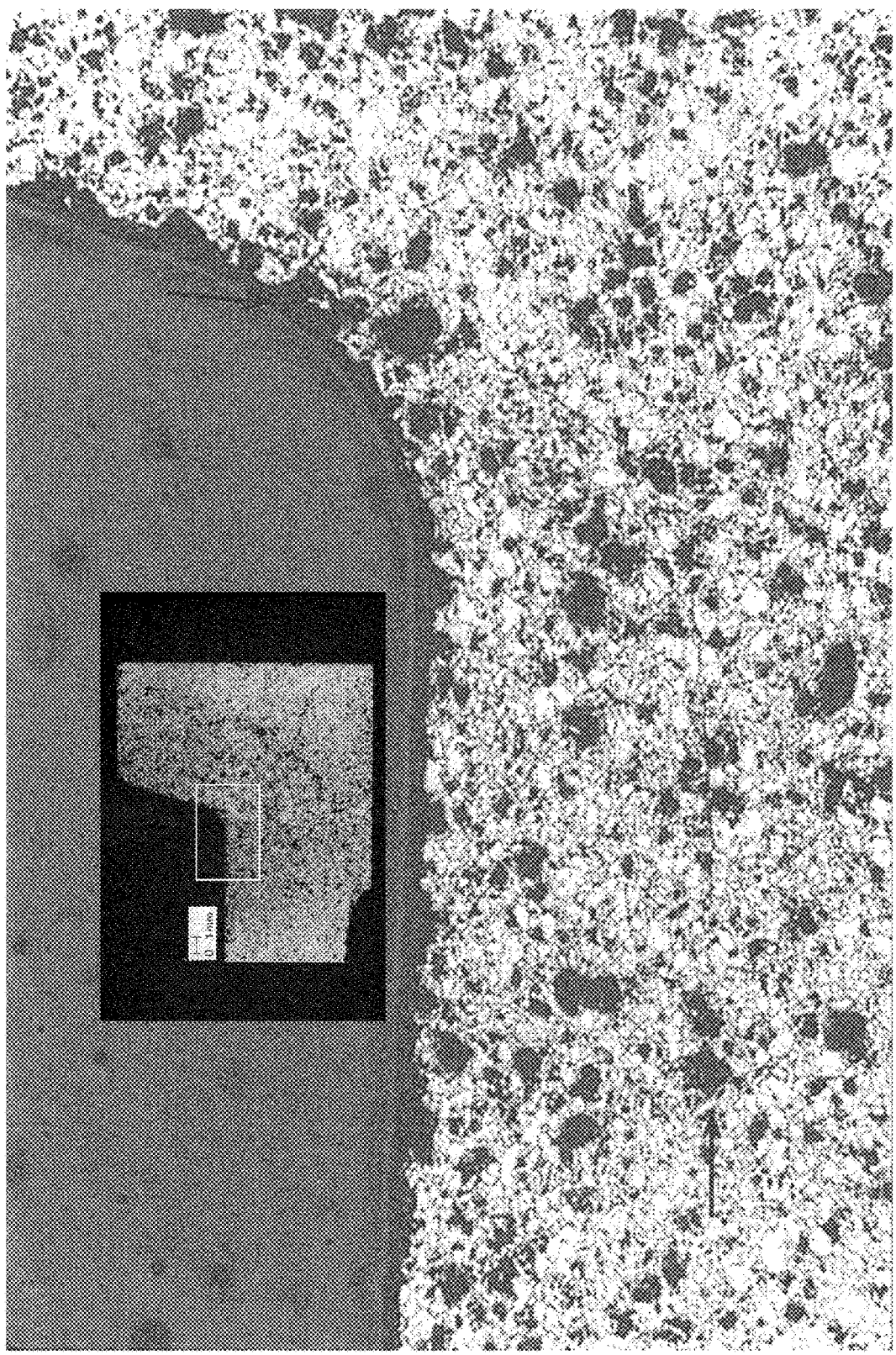

FIG. 25 shows a further grinding pattern through a green product of the unit B with a dead-water crack. The dead-water crack extends laterally from the transition, extends to a depth and subsequently upward into the relatively narrow region. In this way, a breakaway from the transition occurs.

Figure 26:
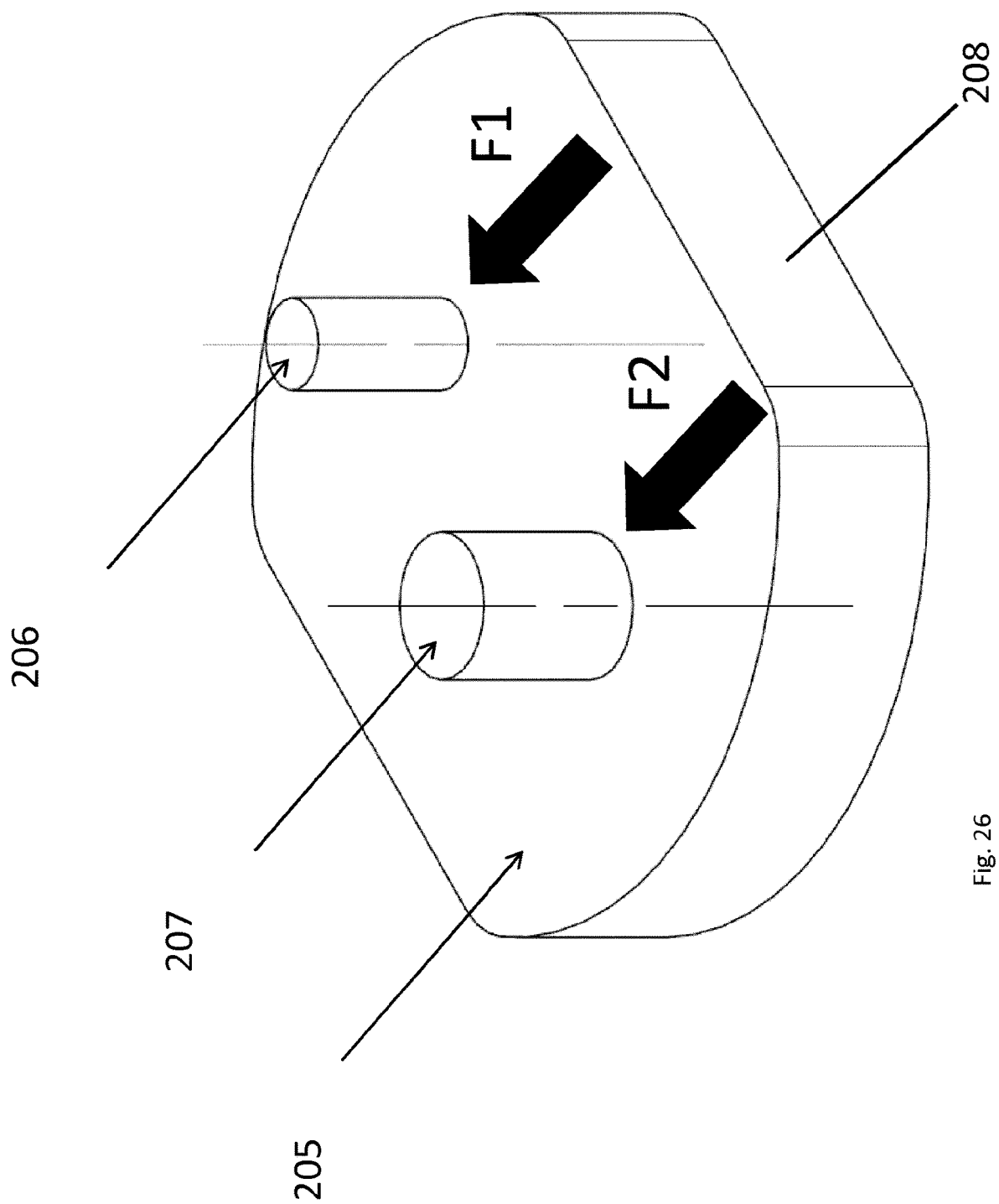

FIG. 26 shows, in an exemplary embodiment, a unit which is produced in accordance with the "green-in-green" method according to the invention and which is configured with a respectively predefinable predetermined break and which has a main body 205 from which two components 206, 207 project, which components fail under the action of mutually different forces F1, F2, for example, as illustrated, owing to shear. Here, different cross sections and/or different densities may be used in order to realize different strengths. Aside from a pressure load, it is also possible for a torque load, a bending load and/or a tensile load to be utilized to achieve a respective predetermined break under predefinable conditions in the case of a safety unit. Aside from two, it is also possible for more components to be provided, which, configured in each case differently from one another, undergo a predetermined break. The main body 205 preferably has a geometry such that its circumferential surface 208 can be utilized as a means for dissipating a force and/or a moment and/or for transmitting an opposing pressure or an opposing moment.

Figure 27:
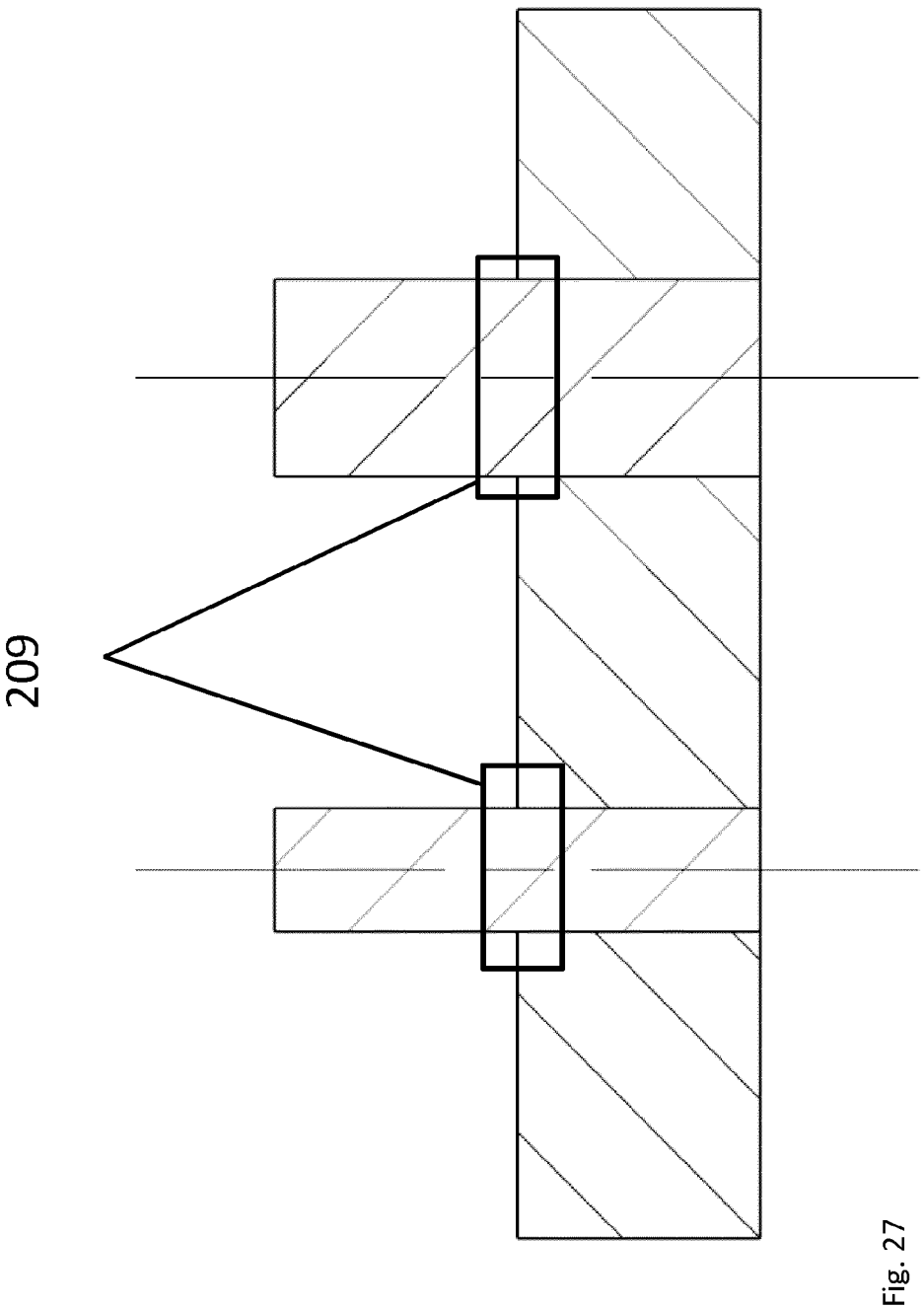

FIG. 27 shows, in a schematically simplified illustration, the region 209 in which, in each case, the predetermined break reliably occurs. By way of the homogeneous compaction of the respective partial green products joined one inside the other by way of an interference fit, reliable predictability of failure, and thus usage as a safety component with a predetermined break for safety purposes, are possible.

Figure 28:
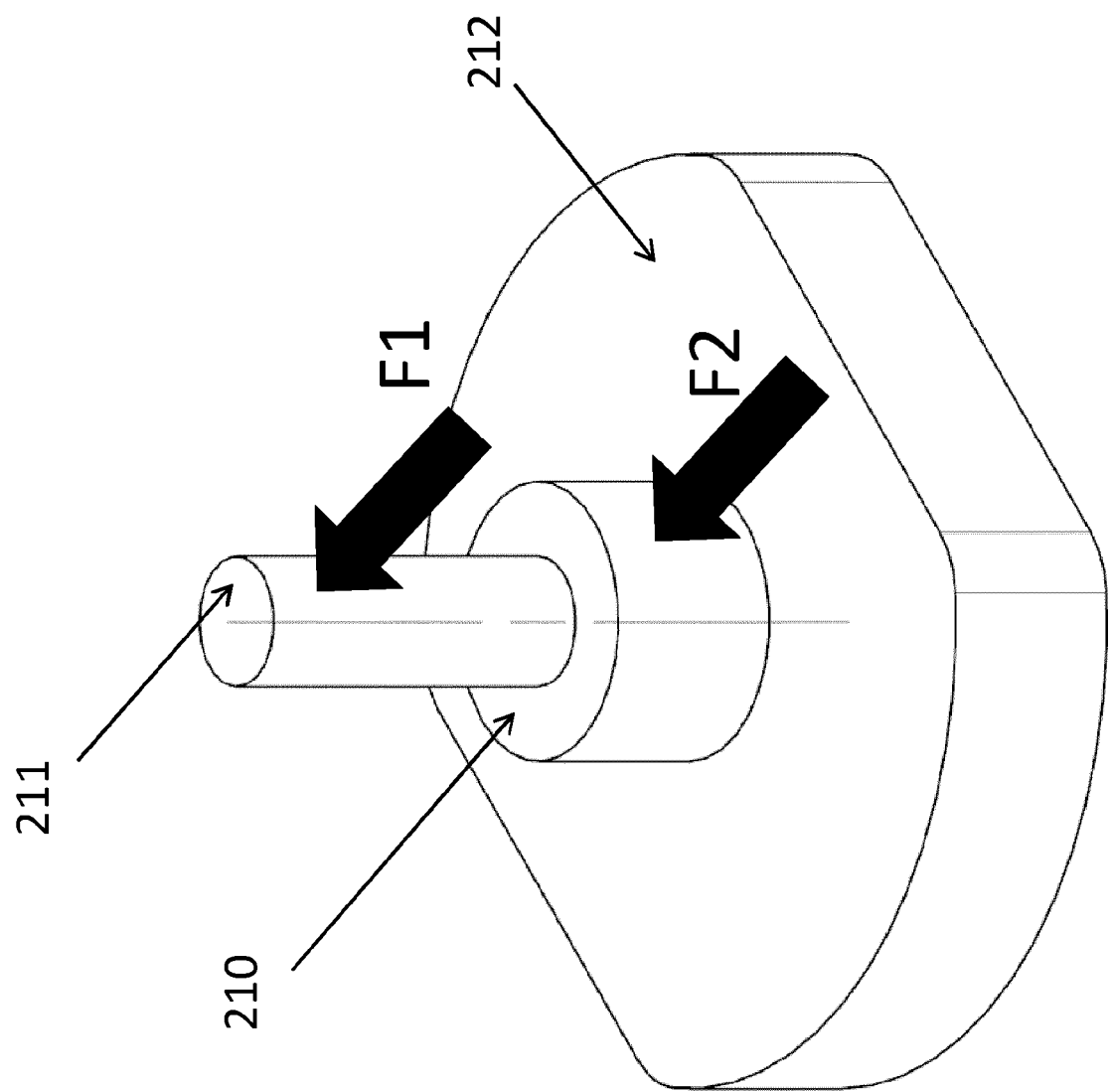

FIG. 28 shows a further unit with mutually concentrically arranged components in a main body 212. In the example illustrated, it is sought to realize a safety action when shearing and bending occur. The components 210, 211 fail under the action of different forces F1, F2. In this example, it is also possible for a force F1 to impart a bending load and for a force F2 to impart a shear load. Here, use may likewise be made of different cross sections and/or different densities in order to realize different strengths. A torque load and/or tensile load is also conceivable, as are combinations of the various forces and moments.

Figure 29:
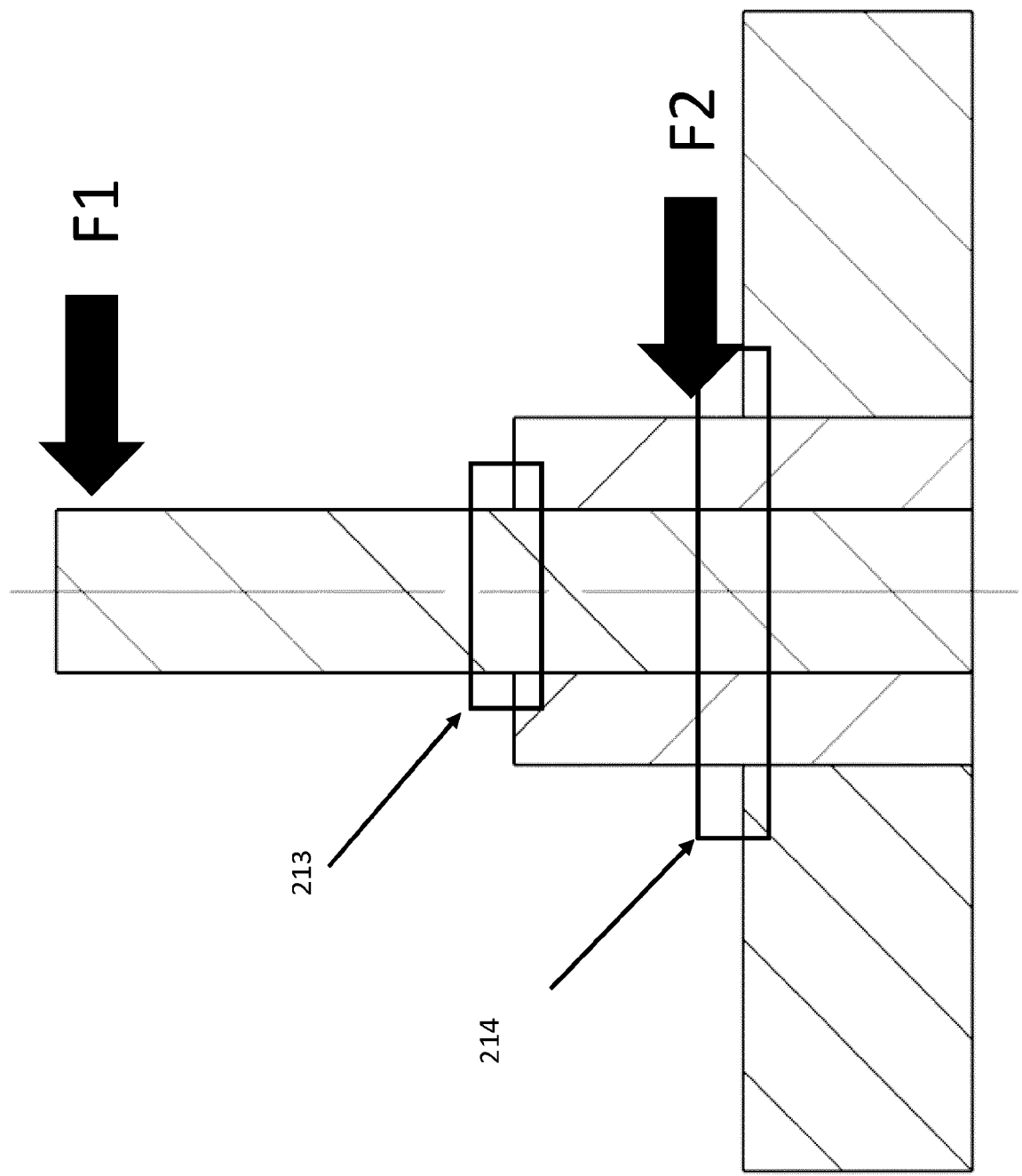

FIG. 29 shows, in a schematic view relating to FIG. 28, the regions in which the predetermined break predictably takes place. Whereas, in an upper region of the failure 213, said failure occurs for example owing to notch stresses, it is the case in a lower region of the failure 214 that said failure occurs for example by way of a shear crack.

The configuration of the unit makes it possible, for example utilizing a notch effect of a geometric form, to permit a reliable predetermined break even in the case of sintered units produced from metallic or ceramic powder. In this way, a sintered body of said type can be used as a safety unit.

The invention claimed is:

1. A method for producing a green product composite, having at least a first partial green product and a second partial green product, in a press, wherein,
   within a pressing cycle, a powder is introduced into a filling chamber of the press and is subsequently separated into a first partial amount and a second partial amount in the press,
   within the same pressing cycle, the respective partial amounts are pressed to form a first partial green product and a second partial green product, with homogeneous compaction in each case, and
   the partial green products are, after the pressing in the press, joined to form the green product composite, wherein, by way of the joining, an interference fit is formed between the first partial green product and the second partial green product, and at least one predetermined breaking point is formed in the green product composite.

2. The method as claimed in claim 1, wherein the green product composite is sintered to form a unit, and a predetermined breaking point of the unit is formed in a region in the vicinity of the interference fit.

3. The method as claimed in claim 2, wherein, after the amalgamation of the first partial green product with the second partial green product to form the green product composite, the latter is sintered to form the unit without joint re-compaction of the first and of the second partial green product in the green product composite.

4. The method as claimed in claim 1, wherein the green product composite and/or the sintered unit is formed by virtue of said green product composite or said sintered unit having a first component composed of the first partial green product with a first density and having a second component composed of the second partial green product with a second density which is greater than the first density, wherein the predetermined breaking point of the green product composite and/or of the sintered unit is formed in the first component with the first, relatively low density.

5. The method as claimed in claim 1, wherein the first and the second partial green product are compacted in each case homogeneously and with the same or different density.

6. The method as claimed in claim 1, wherein a different density is achieved in the pressing of the first partial green product than in the pressing of the second partial green product.

7. The method as claimed in claim 1, wherein the at least one predetermined breaking point is outside the interference fit.

8. The method of claimed in claim 1, wherein the at least one predetermined breaking point is a notching.

9. A method for configuring a sintered unit or green product composite with a predefined failure load for a predetermined break, in particular a predetermined breaking point, having the following steps:
producing a first sintered unit or a first green product composite as claimed in claim 1;
subjecting the first unit and/or the green product composite to load until the point of failure of the unit and/or of the green product composite;
detecting a failure load;
detecting a deviation of the detected failure load from the predefined failure load;
varying a predefined pressing pressure during an execution of the method as claimed in claim 1, in order to achieve a different density in the pressing of the first or second partial green product, in the event of the deviation exceeding a predefined tolerance value;
repeating one or more of the preceding steps until the deviation undershoots the tolerance value.

* * * * *